United States Patent
Riza et al.

(10) Patent No.: US 8,035,822 B2
(45) Date of Patent: Oct. 11, 2011

(54) OPTICAL SENSOR FOR EXTREME ENVIRONMENTS

(75) Inventors: Nabeel Agha Riza, Oviedo, FL (US); Frank Perez, Tujunga, CA (US)

(73) Assignee: Nusensors, Inc., Tujunga, CA (US)

( * ) Notice: Subject to any disclaimer, the term of this patent is extended or adjusted under 35 U.S.C. 154(b) by 0 days.

(21) Appl. No.: 12/693,090

(22) Filed: Jan. 25, 2010

(65) Prior Publication Data
US 2010/0128284 A1 May 27, 2010

Related U.S. Application Data

(62) Division of application No. 11/567,600, filed on Dec. 6, 2006, now abandoned.

(60) Provisional application No. 60/742,813, filed on Dec. 6, 2005.

(51) Int. Cl.
*G01B 9/02* (2006.01)

(52) U.S. Cl. .................................................. 356/519

(58) Field of Classification Search ............... 356/480, 356/482, 484, 506, 519
See application file for complete search history.

(56) References Cited

U.S. PATENT DOCUMENTS

| | | | | |
|---|---|---|---|---|
| 4,417,815 | A * | 11/1983 | Murray et al. | 356/480 |
| 5,452,087 | A * | 9/1995 | Taylor et al. | 356/480 |
| 6,639,682 | B2 | 10/2003 | Neily et al. | |
| 2005/0151975 | A1 * | 7/2005 | Melnyk | 356/480 |
| 2007/0006663 | A1 | 1/2007 | Zerwekh et al. | |

OTHER PUBLICATIONS

Zhengyu, Huang, "Sapphire Temperature Sensor Coal Gasifier Field Test", Dec. 8, 2004, SPIE, vol. 5590, pp. 27-36.

* cited by examiner

*Primary Examiner* — Tarifur Chowdhury
*Assistant Examiner* — Jonathan Hansen
(74) *Attorney, Agent, or Firm* — Terry M. Sanks; Beusse Wolter Sanks Mora & Maire, P.A.

(57) ABSTRACT

An optical sensing probe includes a tube having a tip portion configured for placement in an environment in which conditions are to be sensed and an etalon having a known characteristic disposed proximate the tip portion. The tube also includes a head portion remote from the tip portion containing a light directing element for directing light beams at the etalon and receiving reflected light beams from the etalon wherein the received reflected light beams are used for determining an environmental condition proximate the tip portion. A method for measuring a thickness of the etalon may include directing a light beams at different frequencies at the etalon and receiving the light beams from the etalon. The method may also include identifying conditions of the respective light beams condition received from the etalon and then calculating a first thickness of the etalon responsive to the respective conditions and the known characteristic.

26 Claims, 8 Drawing Sheets

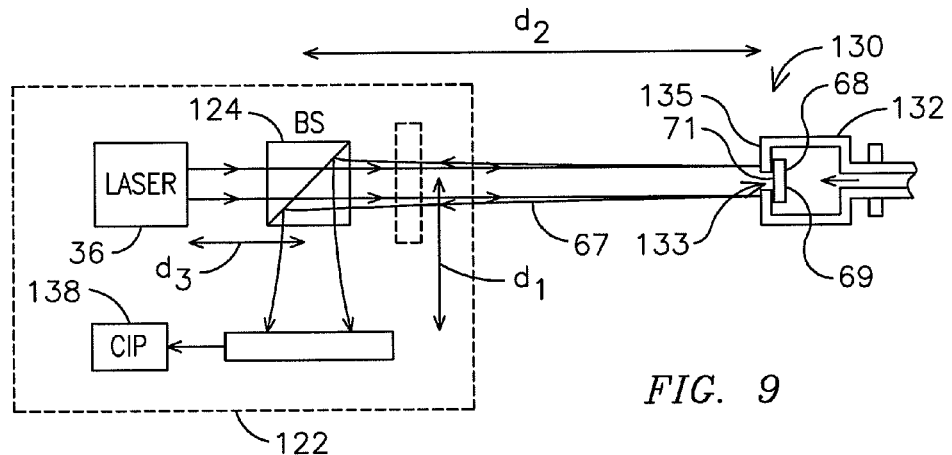
FIG. 9
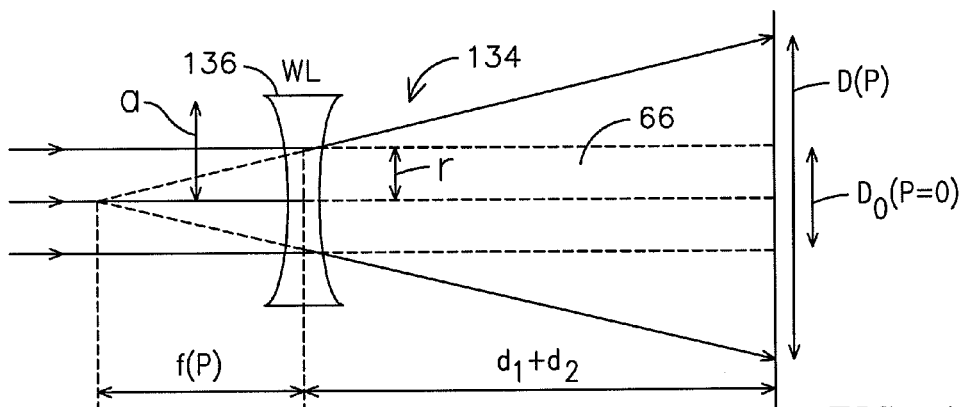
FIG. 10
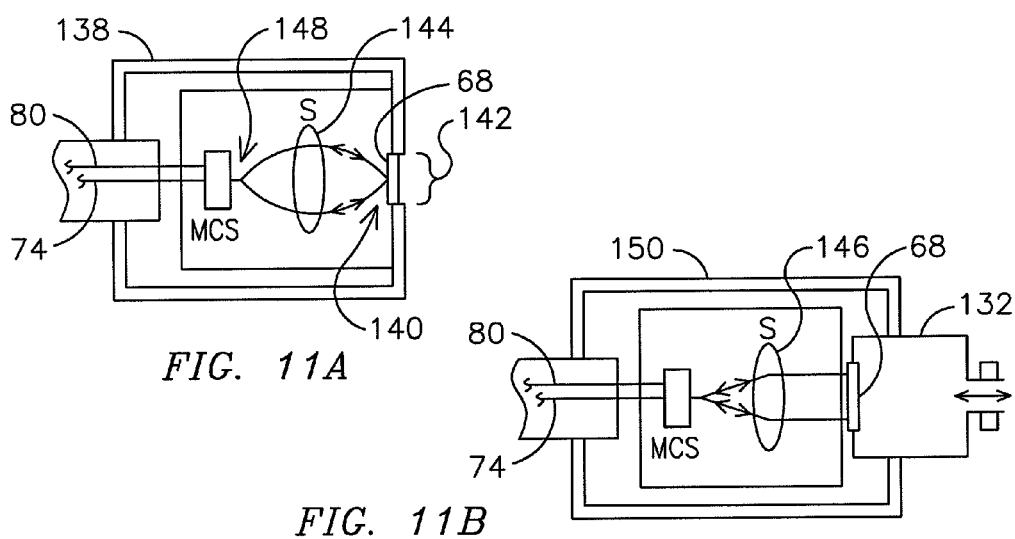
FIG. 11A
FIG. 11B

OPTICAL SENSOR FOR EXTREME ENVIRONMENTS

CROSS-REFERENCE TO RELATED APPLICATIONS

This application is a division of U.S. application Ser. No. 11/567,600 filed Dec. 6, 2006, now abandoned which claims the benefit of U.S. Provisional Application No. 60/742,813 filed Dec. 6, 2005, which are incorporated in their entirety herein by reference.

BACKGROUND OF THE INVENTION

The present invention relates to optical sensors and, more particularly, to optical sensors using etalons for remote sensing in extreme environments.

There are numerous vital sensing scenarios in commercial and defense sectors where the environment is extremely hazardous. Specifically, the hazards can be for instance due to extreme temperatures, extreme pressures, highly corrosive chemical content (liquids, gases, particulates), nuclear radiation, biological agents, and high Gravitational (G) forces. Realizing a sensor for such hazardous environments remains to be a tremendous engineering challenge. One specific application is fossil fuel fired power plants where temperatures in combustors and turbines typically have temperatures and pressures exceeding 1000° C. and 50 Atmospheres (atm). Future clean design zero emission power systems are expected to operate at even high temperatures and pressures, e.g., >2000° C. and >400 atm [J. H. Ausubel, "Big Green Energy Machines," The Industrial Physicist, ALP, pp. 20-24, October/November, 2004.] In addition, coal and gas fired power systems produce chemically hazardous environments with chemical constituents and mixtures containing for example carbon monoxide, carbon dioxide, nitrogen, oxygen, sulphur, sodium, and sulphuric acid. Over the years, engineers have worked very hard in developing electrical high temperature sensors (e.g., thermo-couples using platinum and rodium), but these have shown limited life-times due to the wear and tear and corrosion suffered in power plants [R. E. Bentley, "Thermocouple materials and their properties," Chap. 2 in *Theory and Practice of Thermoelectric Thermometry Handbook of Temperature Measurement*, Vol. 3, pp. 25-81, Springer-Verlag Singapore, 1998].

Researchers have turned to optics for providing a robust high temperature sensing solution in these hazardous environments. The focus of these researchers has been mainly directed in two themes. The first theme involves using the optical fiber as the light delivery and reception mechanism and the temperature sensing mechanism. Specifically, a Fiber Bragg Grating (FBG) present within the core of the single mode fiber (SMF) acts as a temperature sensor. Here, a broadband light source is fed to the sensor and the spectral shift of the FBG reflected light is used to determine the temperature value. Today, commercial FBG sensors are written using Ultra-Violet (UV) exposure in silica fibers. Such FBG sensors are typically limited to under 600° C. because of the instability of the FBG structure at higher temperatures [B. Lee, "Review of the present status of optical fiber sensors," Optical Fiber Technology, Vol. 9, pp. 57-79, 2003]. Recent studies using FBGs in silica fibers has shown promise up-to 1000° C. [M. Winz, K. Stump, T. K. Plant, "High temperature stable fiber Bragg gratings, "Optical Fiber Sensors (OFS) Conf. Digest, pp. 195 198, 2002; D. Grobnic, C. W. Smelser, S. J. Mihailov, R. B. Walker," Isothermal behavior of fiber Bragg gratings made with ultrafast radiation at temperatures above 1000 C," European Conf. Optical Communications (ECOC), Proc. Vol. 2, pp. 130-131, Stockholm, Sep. 7, 2004]. To practically reach the higher temperatures (e.g., 1600° C.) for fossil fuel applications, single crystal Sapphire fiber has been used for Fabry-Perot cavity and FBG formation [H. Xiao, W. Zhao, R. Lockhart, J. Wang, A. Wang, "Absolute Sapphire optical fiber sensor for high temperature applications," SPIE Proc. Vol. 3201, pp. 36-42, 1998; D. Grobnic, S. J. Mihailov, C. W. Smelser, H. Ding, "Ultra high temperature FBG sensor made in Sapphire fiber using Isothermal using femtosecond laser radiation," European Conf. Optical Communications (ECOC), Proc. Vol. 2, pp. 128-129, Stockholm, Sep. 7, 2004]. The single crystal Sapphire fiber FBG has a very large diameter (e.g., 150 microns) that introduces multi-mode light propagation noise that limits sensor performance. An alternate approach [see Y. Zhang, G. R. Pickrell, B. Qi, A. S.-Jazi, A. Wang, "Single-crystal sapphire-based optical high temperature sensor for harsh environments," *Opt. Eng.*, 43, 157-164, 2004] described replaced the Sapphire fiber frontend sensing element with a complex assembly of individual components that include a Sapphire bulk crystal that forms a temperature dependent birefringent Fabry-Perot cavity, a single crystal cubic zirconia light reflecting prism, a Glan-Thompson polarizer, a single crystal Sapphire assembly tube, a fiber collimation lens, a ceramic extension tube, and seven 200 micron diameter multimode optical fibers. Hence this described sensor frontend sensing element not only has low optical efficiency and high noise generation issues due to its multi-mode versus SMF design, the sensor frontend is limited by the lowest high temperature performance of a given component in the assembly and not just by the Sapphire crystal and zirconia high temperature ability. Add to these issues, the polarization and component alignment sensitivity of the entire frontend sensor assembly and the Fabry-Perot cavity spectral notch/peak shape spoiling due to varying cavity material parameters. In particular, the Sapphire Crystal is highly birefringent and hence polarization direction and optical alignment issues become critical.

An improved packaged design of this probe using many alignment tubes (e.g., tubes made of Sapphire, alumina, stainless steel) was shown in Z. Huang. G. R. Pickrell, J. Xu, Y. Wang, Y. Zhang A. Wang, "Sapphire temperature sensor coal gasifier field test," SPIE. Proc. Vol. 5590, p. 27-36, 2004. Here the fiber collimator lens for light collimation and the bulk polarizer (used in Y. Zhang, G. R. Pickrell, B. Qi, A. S.-Jazi, A. Wang, "Single-crystal sapphire-based optical high temperature sensor for harsh environments," Opt. Eng., 43, 157-164, 2004) are interfaced with a commercial Conax, Buffalo multi-fiber cable with seven fibers; one central fiber for light delivery and six fibers surrounding the central fiber for light detection. All fibers have 200 micron diameters and hence are multi-mode fibers (MMF). Hence this temperature sensor design is again limited by the spectral spoiling plus other key effects when using very broadband light with MMFs. Specifically, light exiting a MMF with the collimation lens has poor collimation as it travels a free-space path to strike the sensing crystal. In effect, a wide angular spread optical beam strikes the Sapphire crystal acting as a Fabry-Perot etalon. The fact that broadband light is used further multiplies the spatial beam spoiling effect at the sensing crystal site. This all leads to additional coupling problems for the receive light to be picked up by the six MMFs engaged with the single fixed collimation lens. Recall that the best Fabry-Perot effect is obtained when incident light is highly collimated; meaning it has high spatial coherence. Another problem plaguing this design is that any unwanted mechanical motion of any of the mechanics and optics along the relatively long (e.g., 1 m)

freespace optical processing path from seven fiber-port to Sapphire crystal cannot be countered as all optics are fixed during operations. Hence, this probe can suffer catastrophic light targeting and receive coupling failure causing in-operation of the sensor. Although this design used two sets of manual adjustment mechanical screws each for 6-dimension motion control of the polarizer and collimator lens, this manual alignment is only temporary during the packaging stage and not during sensing operations. Another point to note is that the tube paths contain air undergoing extreme temperature gradients and pressure changes; in effect, air turbulence that can further spatially spoil the light beam that strikes the crystal and also for receive light processing. Thus, this mentioned design is not a robust sensor probe design when using freespace optics and fiber-optics.

Others such as Conax Buffalo Corp. U.S. Pat. No. 4,794,619, Dec. 27, 1988 have eliminated the freespace light path and replaced it with a MMF made of Sapphire that is later connected to a silica MMF. The large Numerical Aperture (NA) Sapphire fiber captures the Broadband optical energy from an emissive radiative hot source in close proximity to the Sapphire fiber tip. Here the detected optical energy is measured over two broad optical bands centered at two different wavelengths, e.g., 0.5 to 1 microns and 1 to 1.5 microns. Then the ratio of optical power over these two bands is used to calculate the temperature based on prior 2-band power ratio vs. temperature calibration data. This two wavelength band power ratio method was described earlier in M. Gottlieb, et al., U.S. Pat. No. 4,362,057, Dec. 7, 1982. The main point is that this 2-wavelength power ratio is unique over a given temperature range. Using freespace optical infrared energy capture via a lens, a commercial product from Omega Model iR2 is available as a temperature sensor that uses this dual-band optical power ratio method to deduce the temperature. Others (e.g., Luna Innovations, VA and Y. Zhu, Z. Huang, M. Han, F. Shen, G. Pickrell, A. Wang, "Fiber-optic high temperature thermometer using sapphire fiber," SPIE Proc. Vol. 5590, pp. 19-26, 2004.) have used the Sapphire MMF in contact with a high temperature handling optical crystal (e.g., Sapphire) to realize a temperature sensor, but again the limitations due to the use of the MMF are inherent to the design.

It has long been recognized that SiC is an excellent high temperature material for fabricating electronics, optics, and optoelectronics. For example, engineers have used SiC substrates to construct gas sensors [A. Arbab, A. Spetz and I. Lundstrom, "Gas sensors for high temperature operation based on metal oxide silicon carbide (MOSiC) devices," Sensors and Actuators B, Vol. 15-16, pp. 19-23, 1993]. Prior works include using thin films of SiC grown on substrates such as Sapphire and Silicon to act as Fabry Perot Etalons to form high temperature fiber-optic sensors [G. Beheim, "Fibre-optic thermometer using semiconductor-etalon sensor," Electronics Letters, vol. 22, p. 238, 239, Feb. 27, 1986; L. Cheng, A. J. Steckl, J. Scofield, "SiC thin film Fabry-Perot interferometer for fiber-optic temperature sensor," *IEEE Tran. Electron Devices*, Vol. 50, No. 10, pp. 2159-2164, October 2003; L. Cheng, A. J. Steckl, J. Scofield, "Effect of trimethylsilane flow rate on the growth of SiC thin-films for fiber-optic temperature sensors," Journal of Microelectromechanical Systems, Volume: 12, Issue: 6, Pages: 797-803, December 2003]. Although SiC thin films on high temperature substrates such as Sapphire can operate at high temperatures, the SiC and Sapphire interface have different material properties such as thermal coefficient of expansion and refractive indexes. In particular, high temperature gradients and fast temperature/pressure temporal effects can cause stress fields at the SiC thin film-Sapphire interface causing deterioration of optical properties (e.g., interface reflectivity) required to form a quality Fabry-Perot etalon needed for sensing based on SiC film refractive index change. Note that these previous works also had a limitation on the measured unambiguous sensing (e.g., temperature) range dictated only by the SiC thin film etalon design, i.e., film thickness and reflective interface refractive indices/reflectivities. Thus maker a thinner SiC film would provide smaller optical path length changes due to temperature and hence increase the unambiguous temperature range. But making a thinner SiC film makes the sensor less sensitive and more fragile to pressure. Hence, a dilemma exists. In addition, temperature change is preferably estimated based on tracking optical spectrum minima shifts using precision optical spectrum analysis optics, making precise temperature estimation a challenge dependent on the precision (wavelength resolution) of the optical spectrum analysis hardware. In addition, better temperature detection sensitivity is achieved using thicker films, but thicker etalon gives narrower spacing between adjacent spectral minima. Thicker films are harder to grow with uniform thicknesses and then one requires higher resolution for the optical spectrum analysis optics. Hence there exists a dilemma where a thick film is desired for better sensing resolution but it requires a better precision optical spectrum analyzer (OSA) and of course thicker thin film SiC etalons are harder to make optically flat. Finally, all to these issues the Fabry-Perot cavity spectral notch/peak shape spoiling due to varying cavity material parameters that in-turn leads to deterioration in sensing resolution.

Material scientists have also described non-contact laser assisted ways to sense the temperature of optical chips under fabrication. Here, both the chip refractive index change due to temperature and thermal expansion effect have been used to create the optical interference that has been monitored by the traditional Fabry-Perot etalon fringe counting method to deduce temperature. These methods are not effective to form a real-time temperature sensor as these prior-art methods require the knowledge of the initial temperature when fringe counting begins. For industrial power plant applications, such a prior knowledge is not possible, while for laboratory material growth and characterization, this a prior knowledge is possible. As shown later in this application, our described sensor designs solve this problem and no longer need the initial temperature data as real-time fringe counting is not used. Prior works in this general laser-based materials characterization field include: F. C. Nix & D. MacNair, "An interferometric dilatometer with photographic recording," AIP Rev. of Scientific Instruments (RSI) Journal, Vol. 12, February 1941; V. D. Hacman, "Optische Messung der substrattemperatur in der Vakuumaufdampftechnik," Optik, Vol. 28, p 115, 1968; R. Bond, S. Dzioba, H. Naguib, J. Vacuum Science & Tech., 18(2), March 1981; K. L. Saenger, J. Applied Physics, 63(8), Apr. 15, 1988; V. Donnelly & J. McCaulley, J. Vacuum Science & Tech., A 8(1), January/February 1990; K. L. Saenger & J. Gupta, Applied Optics, 30(10), Apr. 1, 1991; K. L. Saenger, F. Tong, J. Logan, W. Holber, Rev. of Scientific Instruments (RSI) Journal, Vol. 63, No. 8, August 1992; V. Donnelly, J. Vacuum Science & Tech., A 11(5), September/October 1993; J. McCaulley, V. Donnelly, M. Vernon, I. Taha, AIP Physics Rev. B, Vol. 49, No. 11, 15 Mar. 1994; M. Lang, G. Donohoe, S. Zaidi, S. Brueck, Optical Engg., Vol. 33, No. 10, October 1994; F. Xue, X. Yangang, C. Yuanjie, M. Xiufang, S. Yuanhua, SPIE Proc. Vol. 3558, p. 87, 1998.

BRIEF DESCRIPTION OF THE INVENTION

An exemplary embodiment of the present invention discloses an optical sensor that includes a chamber having an inlet for receiving a fluid into the chamber, an aperture formed in a wall of the chamber, and an etalon having a known characteristic that changes responsive to an environmental condition sealing the aperture, and a light directing element for directing light beams at the etalon and receiving reflected light beams from the etalon, wherein the reflected light beams are used for determining an environmental condition in the chamber.

BRIEF DESCRIPTION OF THE DRAWINGS

FIG. 9 shows an example embodiment of a SiC-chip based remote wireless optical pressure sensor.

FIG. 10 shows a Weak Lens (WL) optical ray-trace model that describes how the SiC chip acts as a pressure dependant concave lens that diverges and magnifies the input laser beam.

FIGS. 11a-11b show an example embodiments of a compact fiber-connected SiC frontend sensor designs for (a) temperature and (b) pressure sensing.

DETAILED DESCRIPTION OF THE INVENTION

Figure 1:
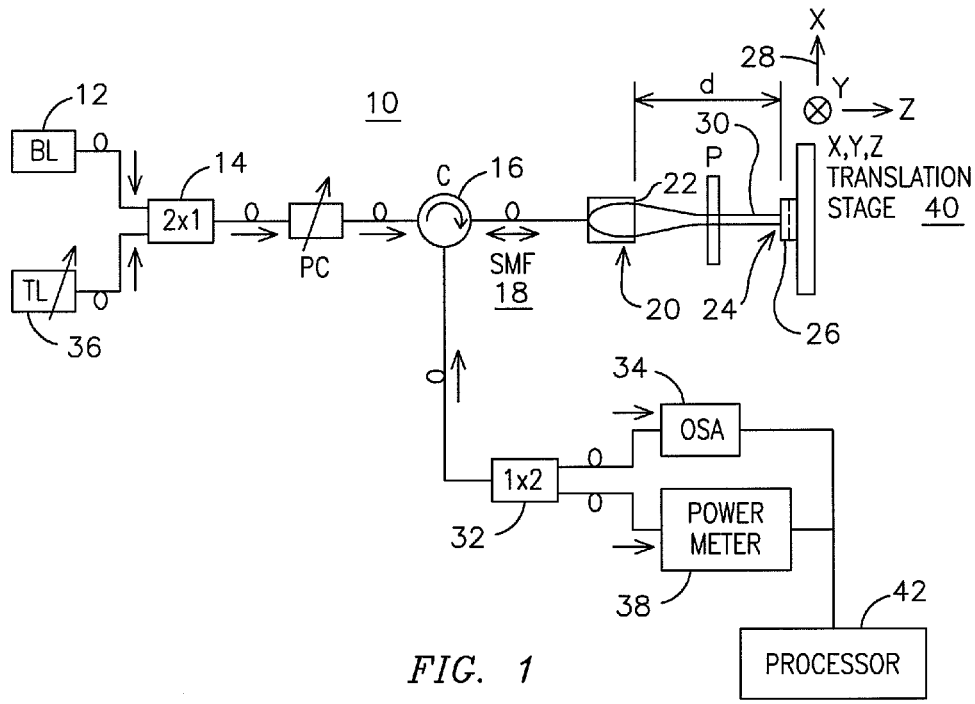
FIG. 1 shows an example embodiment of etalon measurement system using hybrid freespace-fiber optics and wavelength selective interferometry and processing.

Knowing the exact thickness of optical components is a critical need when designing high quality large, miniature, and super small optics for numerous platforms such as integrated-waveguide optics, bulk-optics, and fiber-optics. Over the years, many methods have been described to measure thickness from the thin-film level (i.e., smaller than the optical wavelength) to thick plates (i.e., hundreds of wavelengths). Perhaps the most tried method is based on the classic Michelson optical interferometry using a broadband optical source such as white light [see P. A. Flourney, R. W. McClure, G. Wyntjes, "White light interferometric thickness gauge," Appl. Opt., 11, 1907 (1972); L. M. Smith and C. C. Dobson, "Absolute displacement measurements using modulation of the spectrum of white light in a Michelson interferometer," Appl. Opt., 28, 3339 (1989)]. Here, the short coherence length of the broadband source is used to produce interferometer arms path-length difference-based output detected white light fringes that are processed to obtain the sample thickness measurement. These white light fringes can be captured in the time domain by scanning a reference mirror over a known scan range and recording the fringe power, with the maximum optically detected power position giving data to calculate the sample thickness. This method has also been called low coherence reflectometry or time domain optical coherence tomography (OCT) [see R. C. Youngquist, S. Can, and D. E. N. Davies, "Optical coherence-domain reflectometry: a new optical evaluation technique," Opt. Lett. 12, 158 (1987); K. Takada, I. Yokohama, K. Chida, and J. Noda, "New measurement system for fault location in optical waveguide devices based on an interferometric technique," Appl. Opt., 26, 1603 (1987); M. Haruna, M. Ohmi, T. Mitsuyama, H. Tajiri, H. Maruyama, and M. Hashimoto, "Simultaneous measurement of the phase and group indices and the thickness of transparent plates by low-coherence interferometry," Opt. Lett. 23, 966 (1998)].

An alternate twist to white light interferometry is wavelength scanning interferometry where the broadband source is produced in time by tuning a laser and the interferometer output is observed on a per wavelength basis [see Y. Ishii, J. Chen, and K. Murata, "Digital phase-measuring interferometry with a tunable laser diode," Opt. Lett., 12, 233 (1987); M. Suematsu and M. Takeda, "Wavelength-shift interferometry for distance measurements using the Fourier transform technique for fringe analysis," Appl. Opt., 30, 4046 (1991); F. Lexer, C. K. Hitzenberger, A. F. Fercher, and M. Kulhavy, "Wavelength-tuning interferometry of intraocular distances," Appl. Opt., 36, 6548 (1997); K. Hibino, B. F. Oreb, P. S. Fairman, and J. Burke, "Simultaneous measurement of surface shape and variation in optical thickness of a transparent parallel plate in wavelength scanning Fizeau interferometer," Appl. Opt., 43, 1241 (2004)].

For instance, the interferometer output can be dispersed into spatially independent bins representing different wavelengths along a linear detector array. In this case, by Fourier transforming the spatially observed optical spectrum, the sample thickness is determined without using any motion of the reference minor or sample along the optical axis. In a similar fashion by temporally sweeping the laser wavelength and temporally Fourier transforming the fringe data, one can determine the sample optical thickness. This Fourier domain approaches are now be referred to as spectral domain OCT. Even ultra-fast light in the TeraHertz (THz) bandwidth range has been described for measuring optical thickness [see F. Huang, J. F. Federici, and D. Gary, "Determining thickness independently from optical constants by use of ultrafast light," Opt. Lett. 29, 2435-2437 (2004)].

As is clear with the previously mentioned techniques that are considered fore-runners in thickness measurement instruments, one must use broadband light of the widest optical spectrum, as the shorter the coherence length, the finer the resolution of the thickness measurement. This in-turn puts an extreme performance requirement on all components used to assemble the interferometer (e.g., Michelson, Fizeau); in particular, material dispersion effects in the optical components can become significant, not to mention increased non-linear effects arising from non-perfect linear tuning of the laser. In addition, interference fringe power data is acquired across the entire optical spectrum to enable the best approximation of the sample thickness. Thus, the broader the spectrum to get a better measurement resolution, more data points are needed to obtain this resolution. Finally and most importantly, a fundamental limit with these broadband interferometric measurement methods is that they ignore the test sample material dispersion effects and hence indeed are only approximations to the real sample thickness. In fact, the instrument designer faces a dilemma where a broader spectrum is expected to give the better measurement resolution but at the same time will add more component and sample material dispersion effects to the measurement, hence reducing the accuracy of the measurement.

In this application, described is a solution to eliminate the effects of using very broadband light, whether in the interferometer optics or the sample. First, described is the use of a direct free-space material dispersion-free laser beam to interrogate the test sample in air that is expected to naturally act as the interferometer via the Fabry-Perot effect. Thus removed is the need for many material dispersion-free optical components required to assemble for example a Michelson interferometer. Second, described is the use of only a few (e.g., five) closely spaced accurately measured discrete wavelengths, thus removing the need to acquire optical power data over a very broad continuous optical spectrum. Third, sample refractive index data at only the chosen few (e.g., five) adjacent wavelengths is needed for processing. Note that today extensive and accurate material dispersion data in the form of the Sellmeier equation is available for key optical substrate materials such as Silicon (Si) [see D. F. Edwards, "Silicon (Si)", in E. D. Palik (Ed.), Handbook of Optical Constants of Solids, Inc., 547 (Academic Press 1985)] and Silicon Carbide (SiC) [see W. Martienssen and H. Warlimont, Eds., Handbook of Condensed Matter and Materials Data, XVII (Springer 2005)]. Fourth, the described thickness calculation uses a closed form expression based on Fabry-Perot interferometry; hence providing an exact measured value for the sample thickness. Finally, the use of a Single Mode Fiber (SMF) coupled to fiber lens optics insures a confocal self-aligning set-up and hence provides the launching and reception of a high collimation on-axis wireless optical beam needed for proper sample access. In effect, the described system is self-calibrating and insures a true thickness measurement. The rest of the application describes the described thickness (or temperature or refractive index) measurement hybrid fiber-freespace system design. Such a system is ideal for measuring the large thickness of sample wafers such as Si and 6H—SiC Crystals such as recently described to form wireless optical sensors for temperature sensing [see U.S. patent application Ser. No. 11/185,540 and N. A. Riza, M. A. Arain, and F. Perez, "Harsh Environments Minimally Invasive Optical Sensing Technique for Extreme Temperatures: 1000° C. and Approaching 2500° C.," in Proceedings of the $17^{th}$ Optical Fiber Sensors Conference, (SPIE 2005) Vol. 5855, p. 687.; N. A. Riza, M. A. Arain, and F. Perez, "Harsh Environments Minimally Invasive Optical Sensor using Freespace Targeted Single Crystal Silicon Carbide," IEEE Sensors J., accepted (2005); N. A. Riza, M. A. Arain, and F. Perez, "6-H Single Crystal Silicon Carbide Thermo-optic Coefficient Measurements for Ultra High Temperatures up to 1273 K in the Telecommunications IR band," J. Appl. Phys., 98, (2005)]. FIG. 1 shows the described hybrid fiber-freespace thickness sensor system that is based on this earlier high temperature freespace targeted temperature sensor design. Because this system relies on the natural Fabry-Perot interferometry produced by the sample placed in air (and if needed vacuum), the optical sample must be a non-scattering partially reflecting (or semi-transparent) parallel-plate structure over the optical observation spot. Earlier, a multi-beam interference approach for thickness measurements was described that was focused on using broadband light for thin-film ($<\lambda$) thickness measurements for films on thick substrates [see R. Swanepoel, "Determination of the thickness and optical constants of amorphous silicon," J. Phys. E: Sci. Instrum. 16, 1214 (1983)]. This study concluded that direct use of all the wideband spectra optical power maxima (or minima) and related wavelength values is not a very accurate method for measuring the thin film thickness. In fact, it was correctly shown that although multi-beam interferometry provides an exact closed form expression for the sample thickness, the technique is extremely sensitive to the sample material dispersion data and requires further optical data and processing to produce better accuracy results [see R. Swanepoel, "Determining refractive index and thickness of thin films from wavelength measurements only," J. Opt. Soc. Am. A, 2, 1339 (1985)]. A key reason for this limitation was the thin-film nature of the sample that caused a large (e.g., 45 nm) separation between adjacent spectra maxima (or minima). This large wavelength separation translated to a large (e.g., 0.05) refractive index change for the adjacent wavelength positions for the used amorphous silicon material.

In addition, these earlier multi-beam interferometry methods provided no instrument self-calibration (or self-alignment) method so the placement of the sample guaranteed a true thickness reading. In an aspect of the invention, an example method for measuring a thickness of an etalon may include directing a first light beam at a first frequency and a second light beam at a second frequency at a first portion of an etalon having a known characteristic and receiving the first light beam and the second light beam from the etalon. The method may also include identifying a first condition of the first light beam and a second condition of the second light beam received from the etalon; and calculating a first thickness of the etalon responsive to the first condition, the second condition, and the known characteristic. The first condition may include at least one of an interference maximum and an interference minimum of the first light beam and the second condition may include at least one of an interference maximum and an interference minimum of the second light beam. The method may further include determining respective refractive indices of the etalon for the at least one of the interference maximum and the interference minimum of the first light beam and for the at least one of the interference maximum and the interference minimum of the second light beam, such as by using the known Sellmeier equation and then calculating the thickness according to equation (2) above.

The described FIG. 1 system solves these problems by using a hybrid design that uses both fiber and free-space optics and etalons such as Si and 6H—SiC whose material dispersion data via the Sellmeier equations are accurately available in the literature [see D. F. Edwards, "Silicon (Si)", in E. D. Palik (Ed.), *Handbook of Optical Constants of Solids*, Inc., 547 (Academic Press 1985); W. Martienssen and H. Warlimont, Eds., *Handbook of Condensed Matter and Materials Data*, XVII (Springer 2005)]. Furthermore, the typical mentioned Si and 6H—SiC substrates are thick (d>>probe wavelength λ, e.g., d=300 μm) leading to small inter-wavelength gaps (e.g., <2 nm) that reduces thickness measurement errors due to inaccuracies in prior reported wavelength dependent refractive index data. These sample conditions are indeed met for the concerned temperature sensor applications using Si and SiC substrates.

The FIG. 1 system 10 uses two optical processing trains. First, a moderate bandwidth (e.g., 10 nm) broadband source 12 directs light beams at the sample 26, such as an etalon, via control of a 2×1 fiber-optical switch 14. Light beams from the broadband source 12 pass via the switch 14 to enter a fiber-optic circulator 16 that directs the light via an SMF 18 to a fiber lens 20. This fiber lens 20 is a special Gradient Index (GRIN) lens that produces an output Gaussian beam 30 with its minimum beam waist 24 located at a distance d from the output GRIN lens surface 22. The location of the freespace beam waist 24 also marks the location of the sample plane. Note that this minimum beam waist 24 location is also where the laser beam has near perfect collimation, a condition required for high quality Fabry-Perot interferometry. Hence, plane waves are launched into the parallel faces of the sample 26 at the localized minimum beam waist 24 spot. To profile the entire sample 26, the sample 26 is physically translated in the plane of the beam cross-section by translation element 40 or stage. For high accuracy thickness measurements, the beam 30 must strike at normal incidence on the sample 26. In the described system, this is naturally achieved by aligning the sample 26 to maximize the received optical power coupled back into the SMF 18. In other-words, only when the sample acts like a retro-reflecting surface in the minimum beam waist 28 plane of the incident beam 30 does one get the lowest freespace-to-SMF coupling loss [see M. van Buren and N. A. Riza, "Foundations for low loss fiber gradient-index lens pair coupling with the self-imaging mechanism," Applied Optics, Appl. Opt., 42, 550 (2003)]. Thus by monitoring the received optical power, one can conclude that the sample 26 is correctly aligned for a true thickness measurement. This same principle is also true for a true temperature (or refractive index) measurement via the optical chip (e.g., SiC crystal) used in the FIG. 1 system that acts as a freespace laser beam targeted temperature sensor.

Because the sample refractive index and optical loss due to all system components is known, one can use Fresnel reflection coefficient theory to estimate the maximum optical power reflected from a given substrate. Hence, knowing the total expected losses from all components in the system including a test sample, one can approximate the expected optical power detected when the sample 26 is correctly aligned. In short, the described system provides the self-calibration feature needed for true measurements via classic Fabry-Perot interferometry. This maximized light re-coupled into the SMF 18 passes via the circulator 16 and another fiber-optic 1×2 switch set 32 such that the sample reflected broadband light enters an optical receiver, such as fiber-coupled optical spectrum analyzer 34. The nature of the used broadband source is to provide a few observable interference fringes for the output spectrum. Hence, perhaps two to 5 fringes are needed to add a 2 to 5 redundancy into the described thickness measurement. Hence, unlike previous approaches that rely on extensive broadband data over continuous and very wide spectra, the described sensor only needs spectra data over a narrow (e.g., 10 nm) range. Specifically, the OSA 34 is used to read the wavelength location of say 5 fringe minima positions. The accuracy of the wavelength reading depends on the resolution of the OSA 34, both in terms of wavelength and optical power reading. Thus, using the broadband source and OSA 34, a first reading of wavelength positions is noted. Next, the two optical switches 14, 32 in the FIG. 1 system are flipped and a tunable laser 36 and optical power meter 38 are switched into the measurement system 10 to take a second reading for wavelength positions. Here the tuning resolution of the laser 36 combined with the accuracy of the power meter 38 will determine the accuracy of the taken wavelength readings. Hence, two sets of wavelength readings can be taken to add fault-tolerance to the measurement system. Pairs of these adjacent spectral minima readings in conjunction with the pre-known sample refractive index data via the known Sellmeier equations is then used to compute the sample thickness value at the given probed sample location set by the mechanical translation stage.

It is well known that the optical power reflectance from a Fabry-Perot cavity is given by:

$$R_{FP} = \frac{R_1 + R_2 + 2\sqrt{R_1 R_2} \cos\phi}{1 + R_1 R_2 + 2\sqrt{R_1 R_2} \cos\phi}, \quad (1)$$

where $R_1$ and $R_2$ are the Fabry-Perot etalon front and back mirror reflectances, respectively. $\phi$ is the round-trip propagation phase accumulated by an optical beam while passing through the sample etalon of thickness t and refractive index $n(\lambda)$ at a wavelength of $\lambda$, and is given by $$\phi = \frac{4\pi n(\lambda) t}{\lambda}$$

at normal incidence. For the test substrate sample in air, $R_1 = R_2 = R = r^2$, where $r = [n(\lambda) - 1]/[n(\lambda) + 1]$ is the Fresnel amplitude reflection coefficient of an air-sample interface. Eq. 1 indicates that the maximum reading of the described FIG. 1 system are taken when $\cos(\phi) = 1$ or $\phi = 2\pi m$, where m=0, 1, 2, 3, ..., while the minimum reading of the received optical power are taken when $\cos(\phi) = -1$ or $\phi = (2m-1)\pi$. Hence, as the wavelength $\lambda$ of the system optical source engaging the sample changes from one spectrum minimum (or maximum) position to the adjacent minimum position, the optical path length in the substrate has changed causing $\phi$ to change by $2\pi$ radians. Given that the first chosen power minimum occurs at a measured $\lambda_1$, the sample round-trip propagation phase accumulated is given by: $\phi_1 = \{4\pi n(\lambda_1) t / \lambda_1\}$. Similarly, for the adjacent power minimum occurring at a measured $\lambda_2$ value, the sample round-trip propagation phase accumulated is given by: $\phi_2 = \{4\pi n(\lambda_2) t / \lambda_2\}$. Given that for any two chosen adjacent spectra power minima with $\lambda_2 > \lambda_1$ the roundtrip optical phase changes by $2\pi$, $\phi_1 - \phi_2$ can be written to give the sample closed-form exact optical thickness value t of:

$$t = \frac{\lambda_1 \lambda_2}{2(\lambda_2 n_1 - \lambda_1 n_2)}, \quad (2)$$

where $n(\lambda_1) = n_1$ and $n(\lambda_2) = n_2$.

The sample substrate cuts can be chosen such that the material has one refractive index in the plane containing the linear polarization and these refractive indices are given by the following Sellmeier equations:

For 6H: SiC (ordinary index);

$$n^2(\lambda) = A + \frac{B\lambda^2}{\lambda^2 - C}, \quad (3)$$

where A=1, B=5.5515, C=0.026406, and $\lambda$ is in μm. In particular, the crystal or c-axis for the given 6H—SiC chip is along the optical beam propagation direction and the crystal ordinary index is given to be normal to the crystal c-axis. Hence the incident linear polarization sees the given ordinary index in Eqn.3 for the 6H—SiC chip.

For Si, $$n^2(\lambda) = \varepsilon + \frac{A}{\lambda^2} + \frac{B\lambda_1^2}{\lambda^2 - \lambda_1^2}, \quad (4)$$

where $\lambda_1=1.1071$ μm, $\epsilon=11.6858$, $A=0.939816$, $B=0.00810461$, and $\lambda$ is in μm.

Figure 2:
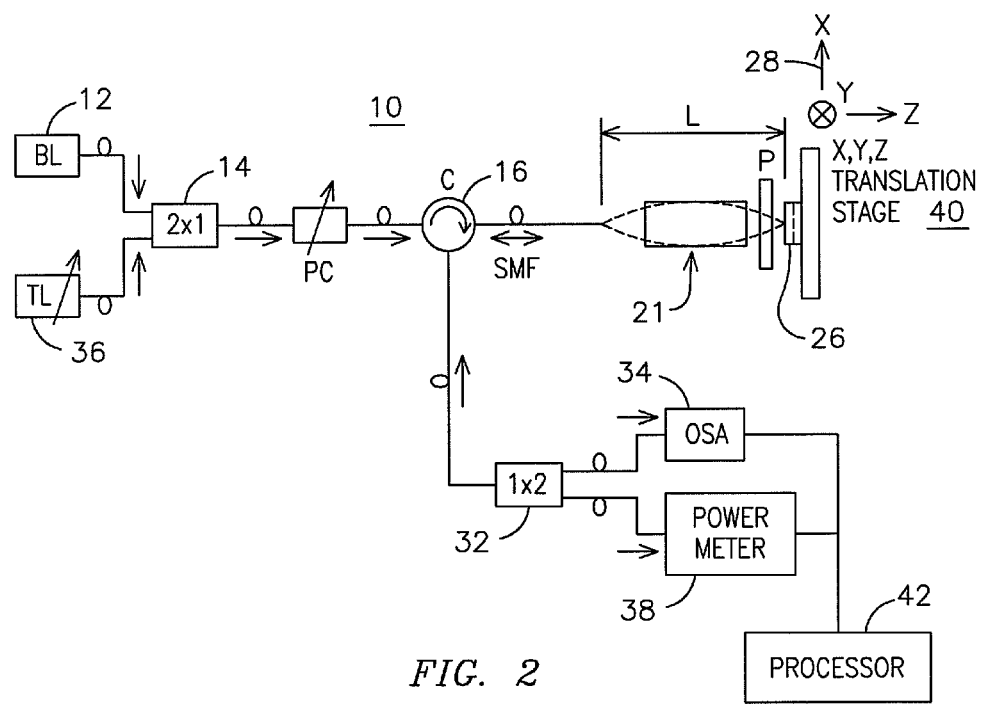
FIG. 2 shows another example embodiment of a high spatial resolution etalon measurement system design using an imaging type GRIN fiber lens.

Do note from FIG. 2 that improved localized thickness measurements are possible using a focused probe beam such as from a 0.29 pitch imaging type fiber GRIN lens 21. In conclusion, this application shows that high measurement accuracy from the described thickness measurement sensor is possible given the high performance of today's state-of-the-art wavelength tunable lasers, optical spectrum analyzers, optical power meters, fiber-optics, optical chip fabrication methods, and well documented optical material dispersion data. The described method provides a simple, self-calibrating, non-contact mechanism for accurate optical chip thickness measurements such as needed for sensors based on a variety of optical crystal chips.

According to the description above, in an example embodiment, a system for measuring a thickness of an etalon may include a first light source, e.g., tunable laser 36 or broadband light source 12, for directing a first light beam having a first wavelength at a first portion of an etalon having a known characteristic and a second light source e.g., tunable laser 36 or broadband light source 12, for directing a second light beam having a second wavelength different from the first wavelength at the etalon, e.g. sample 26. The system may also include an optical receiver, such as optical spectrum analyzer 34 or power meter 38, for receiving the first light beam and the second light beam from the etalon and for providing a first power signal corresponding to the first light beam received from the etalon and a second power signal corresponding to the second light beam received from the etalon. The system may also include a processor 42 for identifying a first condition of the first power signal and a second condition of the second power signal received from optical receiver and calculating a thickness of the etalon responsive to the first condition, the second condition, and the known characteristic.

For extreme temperature, pressure, and corrosive fluid/gas species environments, the FIG. 1 and FIG. 2 sensing/measurement systems require appropriate probe designs and packaging. For these extreme environments, an insertion-type probe design is described in FIG. 3 where the sensor probe 44/stick is inserted into the harsh sensing zone 46 via an inlet with a sealed gasket G1 48 and fitting FT 50 on the probe engaging another high pressure gasket and fitting in the chamber wall inlet. The sensing chamber gasket & fitting couples with the sealed gasket-fitting G1 48-FT 50 on the probe 44, making a temperature, pressure and gas isolating interface between the extreme sensing environment 46 (e.g., combustion chamber, turbine engine, etc) and external ambient environment 52 where instrument controls and technicians operate and service the industrial systems. A typical extreme or hot zone temperature T1 a certain distance equivalent to the L1+L2+L3/2 length of probe (e.g., 100 cm) inside the chamber away from the internal wall 54 might be T1=1600° C., while the temperature at the chamber internal wall 54 might be T2=600° C. At the exterior wall 56 location, the temperature T3 will be lower (e.g., 400° C.) compared to the interior wall 54. Further, the probe temperature T4 a certain distance L3 away from the exterior wall 56 and in the ambient conditions (e.g., 60° C. temperature) environment will be a much lower value, e.g., T4=200° C., due to thermal cooling due to ambient air convection and thus heat transfer over the probe surface. This T4 to T3 temperature range probe length can have a typical, e.g., L4+L3/2=30 cm length in the ambient conditions zone 52 so it is away from the chamber wall hot zone 46 and hence safer for handling. An additional thermally insulating probe section 60 of length L5 (e.g., 10 cm) is added to take the probe temperature down from T4 to T5 where T5 is the ambient temperature, e.g., T5=60° C.). This T5 temperature section of the probe 44 is the probe terminal head section "H" 62 that contains a light directing element, or probe transmit and receive beam conditioning and control optics 63. The total probe length from hot zone tip portion 64 to head portion 62 can be estimated to be L1+L2+L3+L4+L5, e.g., 140 cm. Hence, the freespace light beam 66 must travel a distance L1+L2+L3+L4+L5 (e.g., about 140 cm) to strike an etalon, for example, 6H—SiC sensor crystal/chip 68. For the extreme hot temperature conditions, the hotter probe sections from temperature T1 to T4 (or lengths L1+L2+L3+L4) are vacuum sealed to prevent air turbulence inside the probe 44 that can spatially spoil the laser beam 66 to and from the SiC chip 68. The use of a vacuum in the sealed SiC is a design option for reducing possible beam spoiling/wander effects on the laser beam 66 in case the tube is containing air. The L5 section made for a low CTC material can contain air under favorable ambient conditions with minimal turbulence. Alternately, the entire length of the probe 44, i.e., L1+L2+L3+L4+L5 can be vacuum sealed to insure that no air turbulence affects the propagating a light beam, such as freespace laser beam 66.

Figure 3:
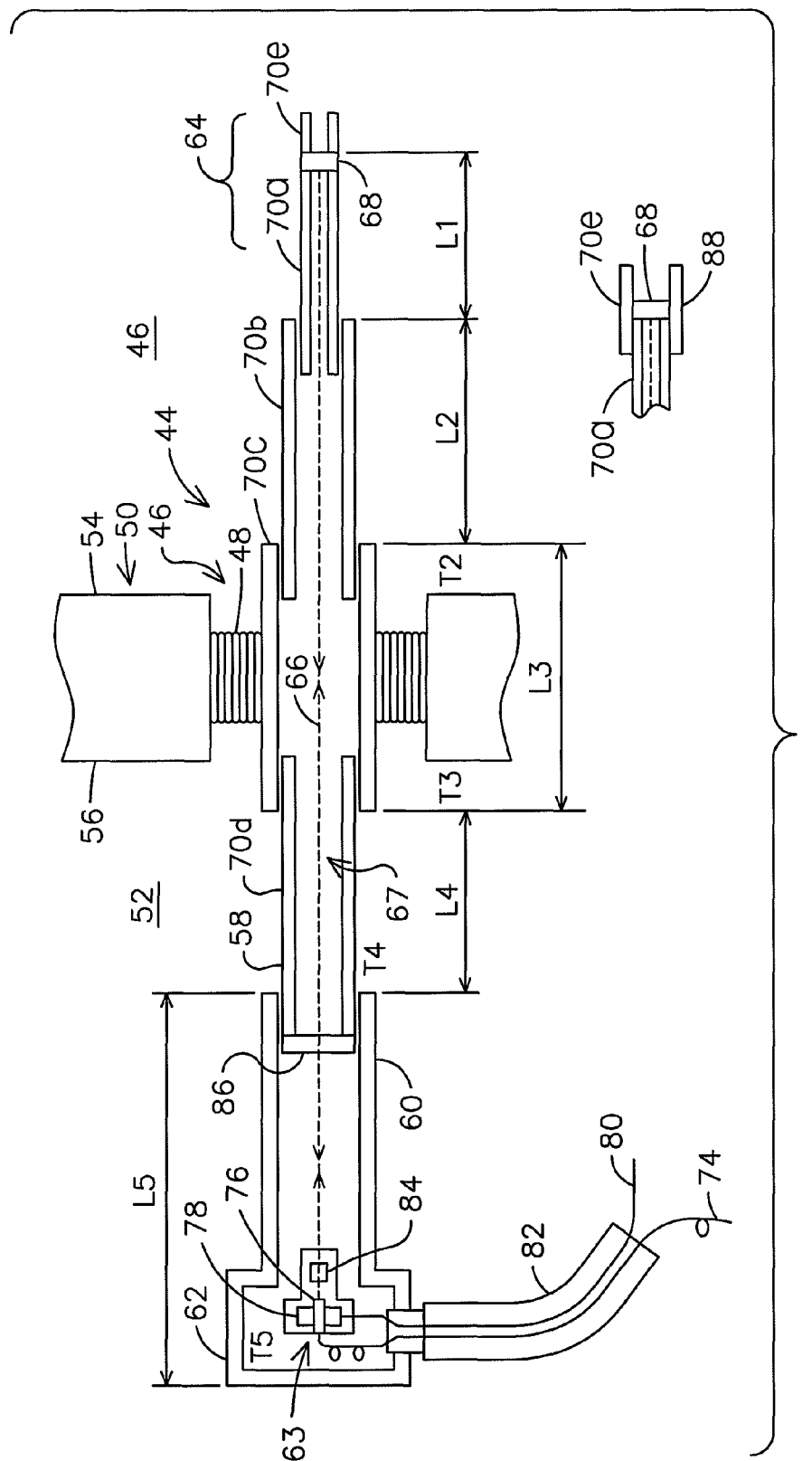
FIG. 3 shows another example embodiment for a probe package design using SiC and low thermal conductivity tubes.

SiC tubes (labeled as ST's in the FIGS. 3-7) may be made of a variety of SiC material forms (see Morgan Advanced Ceramics/HaldenWanger, Germany) such as Halsic-R (recrystallized SiC), Halsic-I (silicon infilterated SiC), Halsic-S (sintered SiC), Halsic-RX (recrystallized and doped SiC). Some of these SiC tubes are porous (e.g., Halsic-R) while others (e.g., Halsic-S) are impermeable to gases. Hence, also described is possible use of the porous-type SiC tubes for gas species optical sensing using the described freespace laser beam sensor probe designs. For vacuum seal tube designs, the impermeable SiC tubes are required for probe assembly. If sealing of SiC tubes is not essential for the described probe design under given applications, then one can deploy the porous SiC tubes for probe assembly. Typically, commercial SiC tube are available with lengths up-to 3 m and outer-diameters ranging from 15 mm to 80 mm and inner diameters ranging from 5 mm to 66 mm. Hence, as shown in FIG. 3, a SiC tube e.g. 70a can be inserted into another SiC tube e.g. 70b to enable longer probe lengths and probes with large surface area for heat dissipation. For the lower CTC high insulation tubes labeled as "I" tubes 60 to house the optics 63, other ceramic materials can be used such as alumina (see Morgan Technical Ceramics, Catalog, Fairfield, N.J., USA) or sheath materials such as Tantalum, Molybdenum, Platinum/Rhodium, Inconel 600, Nickel-Chrome based Super OMEGACLAD XL and insulators such as Hafnium Oxide, Magnesia, and Alumina (see Omega Exotic Thermocouple Probes Catalog, Stamford, Conn., USA). Depending on the porosity of the SiC tube used for the described probe design, the quality of the vacuum sealing will vary. To make sure excellent vacuum sealing is possible if needed, one can encase the entire SiC tube 70a-70e and related optics 63 in one larger non-porous tube such as made of stainless steel that will realize a high quality vacuum seal.

In FIG. 3 and related described designs, optics may be mounted on a thermally stable substrate Base Plate B 72 with appropriate low CTE and CTC materials. FIG. 3 and later related designs use a Single Mode Fiber (SMF) 74 coupled to a collimating Fiber Lens (FL) 76, with alignment mechanism, such as a tip/tilt element and/or a translation element, controlled precisely by a piezoelectric motion stage 78 coupled to the FL 76. This piezoelectrically controlled FL 76 is critical for exactly targeting the center of the SiC crystal chip C 68 a distance L1+L2+L3+L4+L5 from the lens. More importantly, the piezoelectrically controlled FL tip/tilt position makes sure the laser beam 66 produces a retroreflective or collinear beam that can be coupled back into the SMF 74. Hence, as in designs in FIGS. 1 & 2, the FIG. 3 probe 44 is self-aligning and self-calibrating as only for the correct tip/tilt/translation setting of the FL 74 will produce the correct power of the receive coupled light into the SMF, this insuring that the sensor is correctly calibrated. In addition, if there are unwanted mechanical vibrations in the probe, the long length of the freespace laser beam path 67 will not be a limitation as active laser beam alignment is present in the described probe 44. Also, hitting the correct spot on a target etalon, such as the SiC chip 68, for all temperature readings is important because the chip 68 has a given thickness and refractive index change behavior with temperature given its specific packaging with the SiC tube ST1 70a and ST5 70e. As the probe 44 is calibrated for a given laser beam hit location on the SiC chip 68, the same location must be struck during all operations of the probe 44. There are a number of companies that make precision motion controls using piezoelectric ceramics for fiber-optical alignment. These include ultrafast piezo tip/tilt platform and Z (on axis) positioner Model S-325 from Physik Instruments (PI), Auburn, Mass., USA (and Germany), 2-axis filter stages from Piezo Systems, Inc., Cambridge, Mass., and Nano-MTA series tip/tilt actuators from Mad City Labs, Madison, Wis. In short, the described probe 44 may use a state-of-the-art tip/tilt motion stage to make sure the laser beam 66 is correctly aligned in the insulation I 60 and SiC ST tubes 70a-70e and also strikes the SiC crystal chip C 68 for perfect retro-reflective beam operations. SMF-FL freespace alignment constraints and quantified limits has been earlier reported in Martin van Buren and N. A. Riza, "Foundations for low loss fiber gradient-index lens pair coupling with the self-imaging mechanism," Applied Optics, LP, Vo. 42, No. 3, Jan. 20, 2003. and Shifu Yuan and N. A. Riza, "General formula for coupling loss characterization of single mode fiber collimators using gradient-index rod lenses," *Applied Optics*, Vol. 38, No. 15, pp. 3214-3222, May 20, 1999. Erratum, Applied Optics, Vol. 38, No. 30, p. 6292, Oct. 1999. Light launched from the SMF-FL can preferably use the self-imaging condition in Martin van Buren and N. A. Riza, "Foundations for low loss fiber gradient-index lens pair coupling with the self-imaging mechanism," Applied Optics, LP, Vo. 42, No. 3, Jan. 20, 2003, this making sure of high coupling efficiency for receive light back into the SMF. Note FIG. 3 only shows the SMF 74, although as in FIG. 1 and FIG. 2, the SMF 74 is connected to other optics such as a fiber-optic circulator, tunable and broadband laser, switches, OSA, and optical power meter and data processor. For alignment purposes, one can tune the laser to get maximum light power back into the SMF 74 to simulate constructive interference in the Fabry-Perot effect in the SiC chip 68 under probe calibration conditions. Along with the SMF 74, an electrical cable E 80 is connected to the piezo-motion stage M 78 for controls of the stage 78. One can envision simultaneously using a visible light laser for alignment purposes while the infrared laser for the temperature sensing operations. Appropriate optical filters may be used at the receive optics to prevent any unwanted optical bands from saturating or adding noise to the photodetection process such as via Black-body thermal radiation. The SMF 74 and E 80 are in a protective cable PC 82 that has a gasket and fitting inside the I-tube to keep the optical chamber isolated and clean. The optical bench has an optional high extinction ratio polarizer optic 84 such as a calcite crystal polarizer that can improve interference fringe visibility off the SiC chip 68. One can also use a polarization maintaining SMF and hence remove the need for the polarizer P 84 in the probe Head H 62. The SiC tube ST4 70d is closed with an optional glass window W1 86 that makes the SiC tube assembly e.g. 70a-70e vacuum tight or in the least air-isolated from the air in the I tube 60 that contains the optical bench. The need for these isolating windows 86 will depend on the temperature and pressure levels in the extreme environment, the chosen probe design and dimensions, and the chamber testing and insertion zone conditions.

Figure 4:
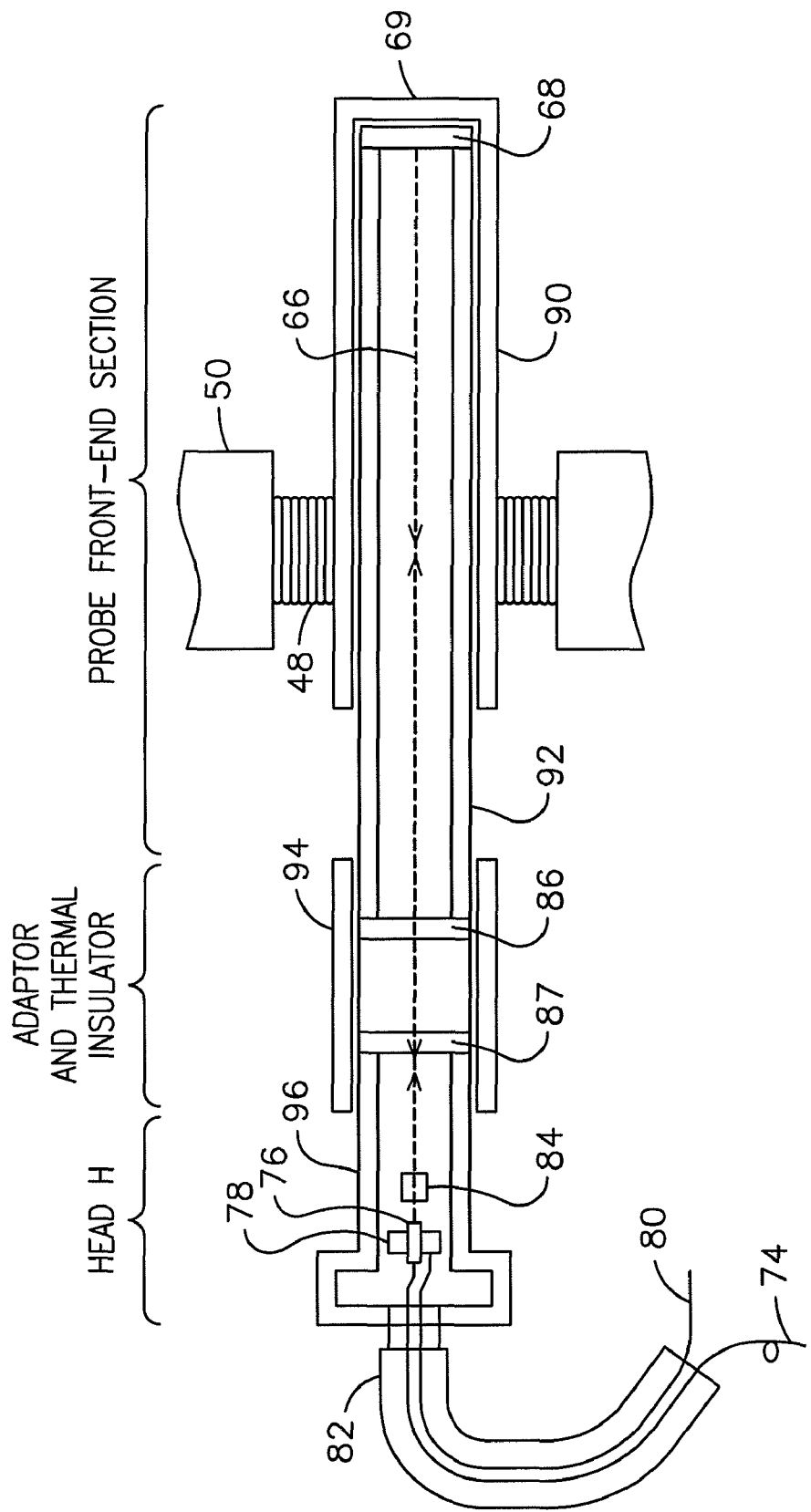
FIG. 4. shows another example embodiment for a probe design using SiC tube-on-tube protection.

To prevent any possible damage/breakage to the sensing SiC single crystal chip (labeled as C 68 in the FIGS. 3-8) due to accidental probe drop or fast hard moving object striking the tip, an optional protective tip cage 88 can be designed around a portion of the probe tip 64. Possible laser drilled holes in the SiC tube cover (ST2 90 in FIG. 4) can allow the hot gases to easily access the chip 68. FIG. 3 and FIG. 4 shows various designs using the SiC tube to protect the SiC chip 68. In FIG. 3, ST5 70e SiC tube is used in two arrangements to protect the SiC chip C 68. Laser bonding can be used to attach the SiC tubes 70a, 70e to each other or to the SiC chip 68. In either design in FIG. 3, the hot gases can access the SiC chip 68 directly producing a direct and fast thermal contact for fast temperature assessment in the hot placement zone of the probe 44. In FIG. 4, a closed SiC tube ST2 90 completely protects the SiC chip C 68. In this case, a physical contact is preferably made between the SiC chip surface and the inside of the ST2 90 closed tube surface to make fast heat transfer into the chip. One can also laser drill tiny holes into the ST2 cover 69 to provide access for the hot gases to the SiC chip surface. Note the inside surface of the ST2 tube cover 69 is optically rough so light passing through the SiC chip 68 is not specularly reflected back to the SMF 74.

The FIG. 4 probe embodiment uses one long SiC tube SL1 92 to form the sealed chamber. In addition, it uses one long SiC tube ST2 90 to act as a protection tube around ST1 92. Also, an adaptor insulator tube I1 94 is used to connect to the optical assembly sitting in another isolated insulating tube I2 96. Here, two optional glass windows W1 86 and W2 87 are used in the tubes to realize seals and isolate thermal transfer to optics.

Figure 5:
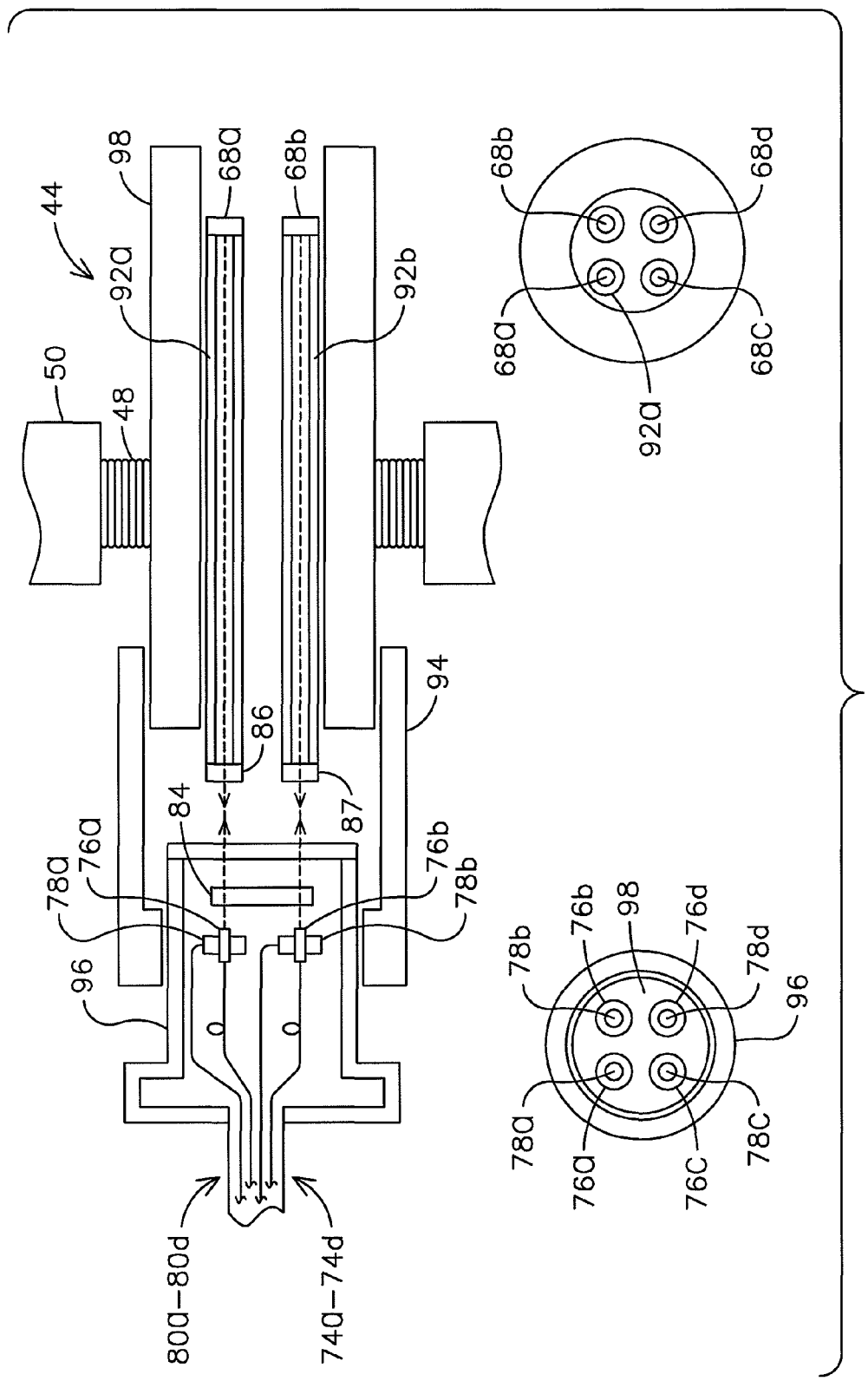
FIG. 5. shows an example embodiment for a Fault-tolerant self-Calibrating probe design.

Proposed in FIG. 5 is a multi-tip probe design using multiple independent SiC crystal chips in separate SiC tubes all encased in one larger SiC tube to enable fault-tolerant and self-calibrating sensing. More specifically, FIG. 5 shows an alternate design that uses four independent SiC chips C1, C2, C3, C4, 68a-68d each one mounted in its own SiC tube assembly 92a-92d as described earlier. In addition, the optical assembly now has four SMF-FL-M assemblies, each matched to its own SiC chip target. One large polarizer P 84 is used for all four optical beams. Four SMFs 74a-74d and related four E 80a-80d cables exit the optical assembly encased in the insulating tube I2 96. The four FL-M's 76a-76d are mounted in a holder H 98. Using a 1×4 optical switch, any one of the SiC chip probes can be activated to provide the temperature reading. On the other hand, all four SMFs 74a-74d can be activated simultaneously for multiple readings of temperature. Hence, the FIG. 5 probe has built-in fault-tolerance and a self-calibration feature. In other words, all four SiC crystals 68a-68d and their related probe sub-assemblies should provide the same temperature reading, given the temperature is considered the same and localized due to the small size of the probe tip region. If the readings from any one or more of the four crystals is different, then the given probe chip is no-longer calibrated. One can design the probe using different chip conditions. The baseline design could use four SiC chips 68a-68d of same thicknesses (and refractive index), and same read and processing wavelengths. Hence one should expect same temperature readings for the same normalized optical power data from all four probe sub-assemblies. This design ensures that the overall 4-channel probe is calibrated and providing correct temperature readings. One can also choose SiC chips 68a-68d with different thicknesses and possibly different refractive indices via different dopant levels in the SiC chips during fabrication. Also, one can use different wavelengths for processing for the four different probe subassemblies to compute the actual temperature reading. In short, the FIG. 5 probe design provides four independent yet simultaneous channels of optical power data that can be used for multi-dimensional signal processing to produce a robust and highly accurate temperature measurement. In effect, note that the chip thicknesses (and refractive indices) and wavelengths used for optical power data generation can be chosen such that unambiguous temperature measurements can be made over a designed temperature range using a particular signal processing formula consisting of a function of the measured normalized minimal four optical power values. The nature of the formula is unique to the probe design and measurement ranges. A simple example formula might be $(P1+P3-\sqrt{P2P4})/(P1+P2+P3+P4+\sqrt{P1P2})$. The idea is that the function value is unique over the design temperature range and hence the temperature measurement is unambiguous. Of course, the earlier described two wavelength phase-based signal processing (see N. A. Riza and F. Perez, "High Temperature Minimally Invasive Optical Sensing Modules," for which a provisional application was filed on Jul. 23, 2004, Application No. 60/590,672; a second provisional was filed on Dec. 7, 2004, Application No. 60/633,900; and for which a non-provisional application for United States Patent was filed on Jul. 20, 2005, application Ser. No. 11/185,540; N. A. Riza, M. A. Arain, and F. Perez, "Harsh Environments Minimally Invasive Optical Sensing Technique for Extreme Temperatures: 1000° C. and Approaching 2500° C.," in Proceedings of the 17$^{th}$ Optical Fiber Sensors Conference, (SPIE 2005) Vol. 5855, p. 687.; N. A. Riza, M. A. Arain, and F. Perez, "Harsh Environments Minimally Invasive Optical Sensor using Freespace Targeted Single Crystal Silicon Carbide," to appear in IEEE Sensors J., accepted (2005) can also be used with the described probe designs to produce the unambiguous temperature data.

Figure 6:
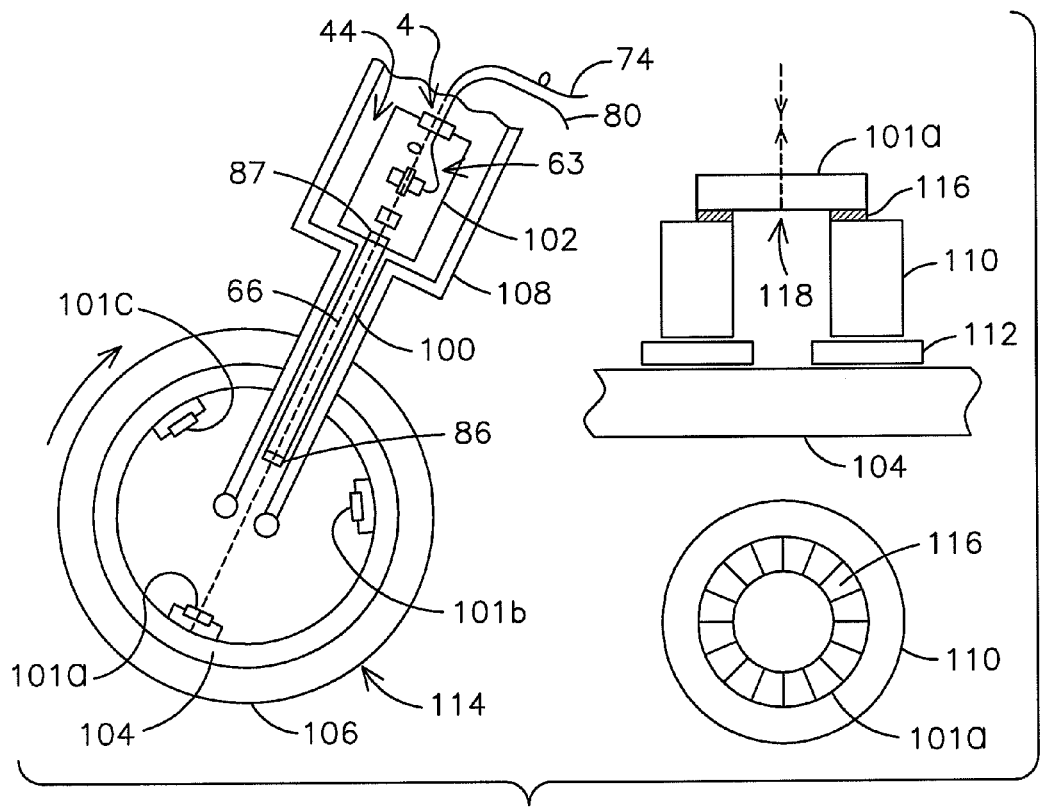
FIG. 6. shows an example embodiment for a Wireless fault-tolerant probe design for moving parts temperature sensing.

An example application of the proposed hybrid SMF-freespace temperature probe shown in FIG. 6 is a temperature sensing probe for moving parts such as a wheel of an aircraft landing gear or a turbine blade in a aircraft engine or power generation system. Proposed is an assembly to meet these temperature sensing requirements when temperature of a moving part is to be determined. Here, if needed, one can use a higher power laser to burn-off any debris and the infrared (IR) red laser to read the moving part temperature. More specifically, FIG. 6 shows an another example probe 44 that has a wireless implementation allowing temperature sensing of a moving part such as a rotating element, such as a wheel 114 or a turbine blade. The SiC chip C1 101a is mounted on a short SiC tube ST1 110 using laser bonding. The SiC tube 110 is mounted using a fitting FT1 112 to the wheel base 104 of the wheel 114. The probe 44 is disposed proximate to a support structure, such as by being inserted into a wheel axle rod fitting 108. The probe 44 is based on a SiC tube 100 with an optional exit glass window W1 86. The optical assembly 63 in the probe 44 is similar to the earlier described (e.g., FIG. 3) design with an optional glass window W2 87. The laser beam 66 from the probe 44 hits the chip C1 101a every one revolution of the wheel 114. The probe 44 can use a pulsed high power laser synchronized with the wheel rotation to enable high efficiency optical data processing. Note that multiple SiC chips (e.g., C2 101 *b* and C3 101c) can be added to the moving part to add redundancy/fault-tolerance to the measurement system. Also, using multiple SiC chips at different locations produces a distributed wireless temperature measurement system. Note that a collinear additional visible laser beam can be used for alignment as well as keeping the SiC chip clean off debris, etc., by laser burning any deposits on the chips 101a-101c.

FIG. 6 shows a SiC single crystal chip 101a mounting where the laser bonding zone 116 forms at outer ring on the chip 101a. Hence, the chip 101a is in a way clamped to the SiC tube 110 with the internal chip region 118 free to deform under high temperature high pressure differential conditions. Given a large diameter (e.g., 5 mm) of the SiC chip 101a, thermal and pressure effects have minimal local effects in the inner ring (e.g., <3 mm diameter) of the chip. This inner localized and flat region of the chip is targeted by the laser beam for proper temperature readings.

Figure 7A:
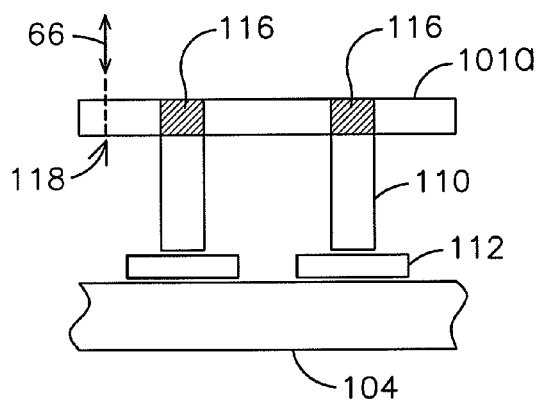
FIGS. 7a-7b show an example embodiments of a mounting mechanism for the SiC crystal chip on (a) a SiC tube and (b) a SiC substrate mount using laser bonding.
Figure 7B:
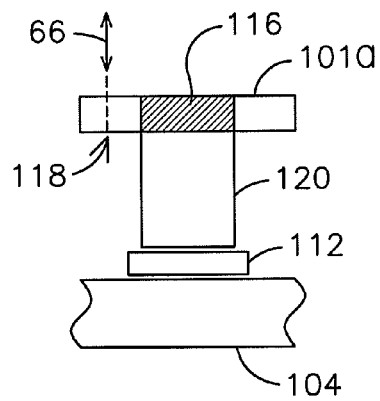

FIG. 7 shows an alternate mounting of the SiC chip 101a for moving-parts or stationary but targeted temperature sensing applications. This alternate mounting condition for the SiC chip is less effected by pressure differentials between the two faces of the chip. FIG. 7(*a*) shows one design using the previously mentioned SiC chip 101a laser-bonded mounting onto a SiC tube 110. The key point to note here is that the tube 110 outer diameter is smaller than the SiC chip 101a diameter, thus allowing the chip boundary to expand as needed due to temperature effects without deforming the outer part of the chip 101a. More importantly, under high pressure conditions, the pressure is the same on both sides of the chip 101a in the region that is the outer boundary 118 of the chip 101a. Hence, pressure will essentially not effect the chip flatness at these boundary 118 location. Hence, the targeted temperature sensing beam must strike the chip at this outer free-moving boundary 118 zone of the SiC chip 101a. FIG. 7(*b*) shows an alternate mounting design where the SiC chip 101a is laser bonded to a SiC form (e.g., recrystallized or polycrystalline SiC) substrate 120 where the entire central region 116 of the SiC chip 101a is laser-bonded to the substrate 120. This design again leaves the boundary 118 of the chip 101a free for expansion due to thermal effects. Again, pressure or changing pressure does not effect the SiC chip 101a as the pressure P is the same on both sides of the SiC chip 101a.

Previously, numerous works have been conducted to measure pressure. Pressure sensors have been built by utilizing the variation in the resistance or capacitance of a device under pressures. Prototype silicon carbide (SiC) high temperature piezoresistive pressure sensors were batch-fabricated at the NASA John Glenn Research Center by producing the diaphragms using a chemical micromachining process, and the sensors showed promise and were demonstrated to operate up to 500° C. [A. A. Ned, A. D. Kurtz and R. S. Okojie, High temperature pressure sensors made from silicon carbide, NASA Tech Briefs, LEW-16772, Glenn Research Center, Cleveland, Ohio, January 2000]. Okojie et al. [R. S. Okojie, A. A. Ned and A. D. Kurtz, *Operation of α(6H)-SiC Pressure Sensor at 500° C.,* 1997 International Conference on Solid-State Sensors and Actuators, (Institute of Electrical and Electronics Engineers, Inc., New Jersey, 1997), pp. 1407-1409] fabricated and tested piezoresistive pressure sensors with full scale output 40.66 and 20.03 mV at 23° C. and 500° C., respectively, at 1000 psi. Ziermann et al. [R. Ziermann, J. von Berg, W. Reichert, E. Obermeier, M. Eickhoff and G. Krotz, *A High Temperature Pressure Sensor with β-SiC Piezoresistors on SOI Substrates,* 1997 International Conference on Solid-State Sensors and Actuators, (Institute of Electrical and Electronics Engineers, Inc., New Jersey, 1997), pp. 1411-1414] used Silicon Carbide on Insulator (SiCOI) to create a piezoresistive pressure sensors and tested its operation between room temperature and 500° C. They reported the sensitivity of the device to be 20.2 µV/V·kPa at room temperature. Since these SiC sensors are based on the principle of piezoresistance, micropipe defects in SiC negatively impact performance. Further research is necessary to harness the full potentials of SiC as efficient high temperature pressure sensors surpassing the capability of silicon-based sensors. Moreover, these SiC MEMS pressure sensors are not wireless passive devices as described for our optical sensor. In other words, electronic power and processing is done on chip that is also being simultaneously exposed to the changing high pressure and temperature environment. In effect, all the processing in the chip must withstand the environmental effects.

Works on producing a wireless pressure sensor includes: A Dehennis, K. D. Wise, "A double-sided single-chip wireless pressure sensor," 15th IEEE International Conference on MEMS, 2002; O Akar, T Akin, K Najafi, "A wireless batch sealed absolute capacitive pressure sensor," Sensors and Actuators A: Physical, 2001; G Schimetta, F Dollinger, R Weigel, "A wireless pressure-measurement system using a SAW hybrid sensor," IEEE Transactions on Microwave Theory and Techniques, 2000. This highlighted sensors require on-chip power plus electronics and contacts that are non-robust to high temperatures. Another design described is passive, that by M A Fonseca, J M English, M von Arx, M G Allen, "Wireless micromachined ceramic pressure sensor for high-temperature applications," Journal of Microelectromechanical Systems, 2002. Nevertheless, this design presently has limitations in temperature (<400 C) and pressure (<7 bars) ranges of operations.

In silicon technology, p-n junction-isolated piezoresistors are used as pressure sensors for temperatures less than 175° C., and silicon-on-insulator (SOI) sensors for temperatures up to 500° C. Other techniques have also been investigated to measure pressure. Leading fiber-optic sensors such as using fiber Fabry-Perot interference or in-fiber Bragg Gratings with wavelength-based processing by use of the fiber wire for light delivery and light return do not form the needed wireless pressure sensor (see C. E. Lee and H. F. Taylor, "Sensors for smart structures based on the Fabry-Perot interferometer," Chapter 9, pp. 249-270, Fiber Optic Smart Structures, Ed. Eric Udd, Wiley, 1995; R. Duncan, D. Gifford, V. Rajendran, "OFDR tracks temperatures on power generators," Laser Focus World Magazine, p. 89, October 2003; A. D. Kersey, et al., "Fiber Grating Sensors," IEEE/OSA J. Lightwave Tech., Vol. 15, No. 8, pp. 1442-1463, August 1997; Brian Culshaw, "Optical Fiber Sensor Technologies: Opportunities and Perhaps Pitfalls," IEEE/OSA Journal of Lightwave Technology, Vol. 22, No. 1, pp 39-50, January 2004). Optically reflective [L. Tenerz, L. Smith and B. Hök, *A Fiber Optic Silicon Pressure Microsensor for measurements in Coronery Arteries*, in Proc. Sixth Int. Conf. Solid State Sensors and Actuators, Transducers '91, San Francisco, 1991, pp. 1021-1023] and interferometric [T. Katsumata, Y. Haga, K. Minami and E. Esashi, *Micromachined 125 µm Diameter Ultra-Miniature Fiber-Optic Pressure Sensor for Catheter*, Trans. Inst. Elect. Eng. Jpn. Part E, Vol. 120E, 2000, pp. 58-63; J. Zhou, S. Dasgupta, H. Kobayashi, J. M. Wolff, H. E. Jackson and J. T. Boyd, Optically interrogated MEMS pressure sensors for propulsion applications, Opt. Eng., Vol. 40, 2001, pp. 598-604; D. C. Abeysinghe, S. Dasgupta, J. T. Boyd and H. E. Jackson, A novel MEMS pressure sensor fabricated on an optical fiber, IEEE Photonics Tech. Letts., Vol. 13, 2001, pp. 993-995] techniques have also been investigated. The interferometric techniques were based on Fabry-Pérot interferometer/cavity formed by etching a glass substrate or the tip of an optical fiber and enclosing the etched volume with a silicon diaphragm. The materials in these optical devices were glass and silicon which will melt at the high temperature environment in NASA planetary applications. Recently further work in optical pressure sensor has been reported as stated next, but all have their limitations due to the exposure of their non-robust sensing element in the extreme NASA environment. These are: W. Li, D. C. Abeysinghe, J. T. Boyd, "Wavelength Multiplexing of micro electromechanical system pressure and temperature sensors using fiber Bragg gratings and arrayed waveguide gratings," Optical Engg., Vol. 42, 2, pp. 431-438, February 2003; W. Li, D. C. Abeysinghe, J. T. Boyd, "Multiplexed sensor system for simultaneous measurement of pressure and temperature," Optical Engineering., Vol. 43, 1, pp. 148-156, January 2004; D Guo, W. Wang, R Lin, "Theoretical analysis and measurement of the temperature dependence of a micromachined Fabry-Perot pressure sensor," Applied Optics, Vol. 44, 2, pp. 249-256, Jan. 10, 2005; Y. Zhu, A. Wang, "Miniature fiber-optic pressure sensor," IEEE Photon. Tech. Lett., Vol. 17, 2, pp. 447-449, February 2005; J. Xu, G. Pickrell, X. Wang, W. Peng, K. Cooper, A. Wang, "A novel temperature insensitive optical fiber pressure sensor for harsh environments," IEEE Photon. Tech. Lett., Vol. 17, 4, pp. 870-872, April 2005; D. Donlagic and E. Cibula, "All-fiber high sensitivity pressure sensor with $SiO_2$ diaphragm," Optics Letters, Vol. 30, No. 16, pp. 2071-20'73, Aug. 15, 2005. All these fiber-based optical pressure sensors are non-wireless design.

Figure 8:
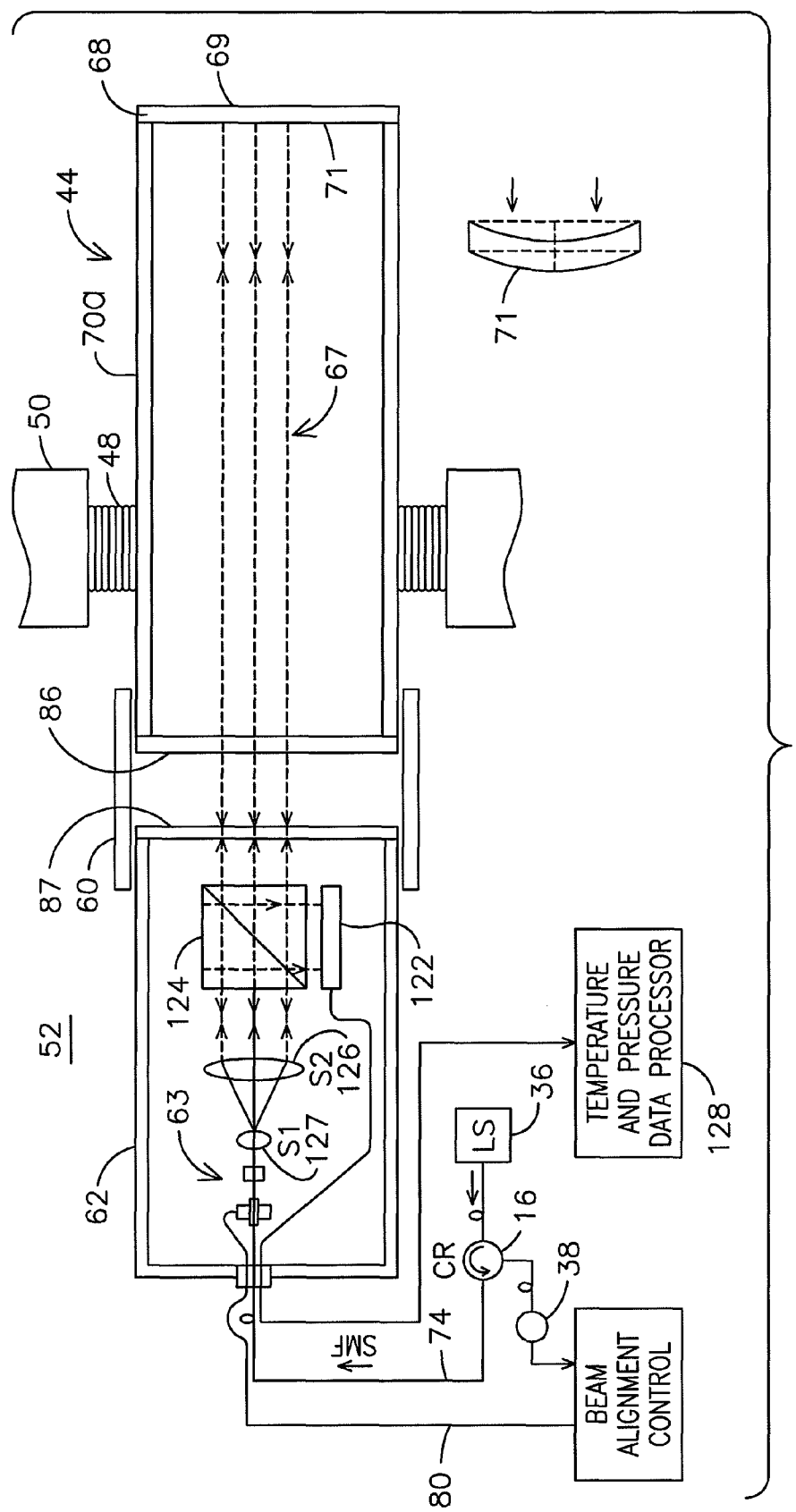
FIG. 8 shows an example embodiment for a design of simultaneous temperature and pressure sensing probe.

Proposed also is a probe design in FIG. 8 that can simultaneously measure temperature and pressure using localized optical beam targeting for temperature sensing and spatial or global optical targeting of SiC crystal chip for pressure sensing via optical interference pattern detection and processing. More specifically, FIG. 8 shows another example probe 44 that can simultaneously measure temperature and pressure. Temperature is measured using the previously described probe designs (FIGS. 1-7) where the localized central flat portion of the SiC chip 68 is targeted and read by the laser beam 66 to estimate the chip temperature. In the FIG. 8 design, the same principle is implemented except that a two dimensional (2-D) large area optical detector such as a CCD camera is used to measure the optical power. In this embodiment, a large diameter beam 67 (e.g., 10 mm) is created by beam expansion optics (lenses S1 127 and S2 126) in the optical assembly such that this large beam 67 strikes nearly the entire, or a majority of, surface area of the used large diameter SiC chip 68. The chip 68 is laser bonded to a large diameter SiC tube ST1 70a that is vacuum sealed at the other end using a glass window W1 86. When external pressure P is applied to the outer surface 69 of the SiC 68 in the probe 44, the chip 68 deforms in-words. Recall that the SiC chip 68 acts like a Fabry-Perot cavity. When the pressure deforms the two surfaces of the chip cavity, like with spherical surfaces as shown in FIG. 8, the optical interference provided by the chip 68 is not uniform over the chip surface 71. Hence the received beam directed to the 2-D camera 122 by the beam splitter 124 shows a given optical interference pattern for a given pressure P and temperature T condition. Note that the SiC front 71 and back 69 surfaces will have unique deformations due to the external pressure effect. Hence the optical reflections caused by these two independent surfaces will have pressure and temperature dependent unique reflected wavefronts that will interfere together at the CCD plane to produce a unique pressure and temperature dependent 2-D interferogram. By processing the central zone of the beam on the chip (and hence the central zone of the detected interferogram), one can compute the temperature of the chip. This is like the FIG. 1-7 temperature probe designs. Hence, knowing the effect of temperature on the chip without pressure effects, one can deduce how much of the global interference pattern was produced due only to pressure P. Using advanced image processing, such as in temperature and pressure processor 128, methods on the measured interferogram and previously measured temperature only and pressure only probe calibration data, one can compute the measured temperature and pressure from the probe design in FIG. 8. The key point to note is that temperature is a spatially local effect on the SiC chip 68 while pressure is mostly a spatially distributed or global effect on the SiC chip 68. Using a small chip diameter can help reduce pressure effects on the chip and hence make it ideal for a temperature-only probe, while using large chip diameters will enhance pressure effects on the SiC single crystal chip 68 allowing both pressure and temperature measurements. Note that since the SiC chip 68 is 2-D and the interferogram is 2-D, one could deduce pressure and gas flow directions/distributions on the SiC chip zone by using image processing methods.

A remote pressure sensor is needed in many applications. Described is Silicon Carbide (SiC) weak lensing effect based wireless optical sensors that allows safe, repeatable, and accurate pressure measurement suitable for harsh environments. This completely passive front-end sensor design uses a remoted free-space optical beam that targets a single crystal SiC chip fitted as an optical window within a pressure capsule. With increasing differential capsule pressure, the SiC chip forms a weak convex mirror with a changing focal length. By monitoring the chip reflected unique light beam fringe pattern magnification, pressure in the capsule is determined. SiC is chosen as the front-end all-passive sensor material due to its robust mechanical, chemical, and optical properties when subject to extreme environments with respect to temperature, pressure and chemically corrosive conditions.

FIG. 9 shows an example pressure sensor 130 using high pressure capsule (HPC). A collimated laser beam 67 passes through a Beam Splitter (BS) 124 and after traveling a distance $d_1$ targets the SiC chip 68 fitted as a window in an aperture 133 in a wall 135 of the High Pressure Capsule (HPC) 132. The beam reflections from the SiC chip 68 travel a distance of $d_1+d_2$ and are captured by an Optical Image Detector (OID) 122. Because laser beams can be highly collimated and the pressure effect on the SiC chip 68 is a mechanical deformation resulting in a weak lensing effect, the distance $d_1$ can be designed to be rather large, e.g. several meters. Thus, only the SiC-based HPC 132 is placed in the hostile zone while the transceiver module containing the laser source 36, alignment optics, and the OID 122 is meters away, allowing safe and remote pressure measurement. Note that the beam reflections from the SiC chip 68 are produced as reflections from the chip front 71 and back 69 surfaces, giving an interferometric fringe pattern that is observed by the OID 122. These fringes contain information about the relative phase differences between the two SiC surfaces 69,71, and are unique for a given SiC chip 68. In the absence of any differential pressure, i.e., pressure inside the capsule 132 is equal to the ambient atmospheric pressure outside the capsule 132, the SiC chip 68 acts like a flat mirror. Thus the laser beam 66 after reflection from the chip 68 continues to diverge in accordance with Gaussian beam propagation and divergence. However, in the presence of differential pressure P, the SiC chip with a circular pressure boundary of radius "a" (in cm) bulges outwards with a maximum central displacement of $w_{max}$ (in cm) given by:

$$w_{max}(P) = \frac{Pa^4}{64D}, \tag{1A}$$

and $$w_{max}(P) = \frac{Pa^4}{64D}\left(\frac{5+v}{1+v}\right) \tag{2A}$$

for the Clamped-Edge model (Eqn.1A) and Supported-Edge model (Eqn.2A), respectively. Here, D is the SiC rigidity constant and v is its Poisson's ratio. The SiC chip 68 under differential pressure P acts as a weak convex mirror or equivalently as a concave lens with focal length f(P) in cm given by:

$$f(P) = \frac{w_{max}^2(P) + a^2}{4w_{max}(P) \times 10^4}\,\text{cm}. \tag{3A}$$

FIG. 10 shows the weak lens optical ray-trace model 134 used to design the described remote pressure sensor where the SiC chip 68 acts like a pressure dependant concave lens 136 that diverges the input laser beam 66. Thus the beam diameter D(P) measured by the OID provides a value for the sensed pressure P. For example, at P=0, f=∞ and D(P)=$D_0$, the initial beam diameter on the OID. Given that the illuminated SiC chip naturally produces a specific fringe pattern via its Fabry-Perot etalon behavior, a given chip that produces a linear fringe pattern due to its slight wedge nature can be used under certain circumstances to design the pressure sensor. In this case, one can essentially use the OID measured fringe period to determine the pressure P. Moreover, using FIG. 10, one can define a pressure dependent sensor magnification factor M given by:

$$M(P) = \frac{D(P)}{D_0} = 1 + \frac{(d_1+d_2)}{f(P)}, \tag{4A}$$

with $d_1+d_2$ in cm and where X(P) is the fringe period for pressure P and $X_0$ is the fringe period for P=0. Thus, by measuring M using the OID, one can remotely deduce the pressure P using the calibration data stored in the Computer Image Processor (CIP). For sensor calibration, one uses a reference pressure gauge to record P versus M data as P is varied over a desired calibration range. With an increasing temperature of the SiC chip 68, one expects an increase in chip thickness via thermal expansion and an increase in material refractive index. Both these factors uniformly change the optical path lengths for the interfering beams from the SiC chip surfaces 69, 71, thus causing fringe pattern shifts with temperature. Nevertheless, the SiC chip weak lens effect that controls beam magnification is expected to be dominated by the pressure-based chip deformation, making the described pressure sensor essentially temperature independent when deploying CTE matched packaging for the SiC chip. Note that one can tune the laser wavelength to optimize received optical power so the receive optical beam boundary at the OID can be clearly measured to access receive beam magnification change due to pressure effects.

Single crystal 6H—SiC is a highly desirable front-end sensor material as its melting temperature is around 2500° C. Moreover, apart from its resistance to chemical attack and excellent optical properties, thick (e.g., 300 μm) single crystal 6H—SiC also has powerful mechanical properties via its elastic, shear, and bulk modulus values and Poisson ratio.

Therefore, the SiC chip forms a robust extreme environment front-end sensor for laser beam-based wireless access. Nevertheless, fiber-optics can play an important role in the described hybrid sensors by providing a wired light delivery mechanism to the wireless port position in the sensor system. Well protected custom Single Mode Fibers (SMFs) made of silica can operate near temperatures reaching 1000° C., thus forming an excellent wired non-line of sight delivery mechanism to a location near the extreme environment where temperatures are still reasonable compared to the extreme environment temperature (e.g., 1500° C. in a combustion chamber).

FIG. 11(a,b) shows some example designs on how SMFs can be combined with the described SiC chip-based sensing principles to realize compact versions of the remoted hybrid sensors. In essence, the distance between the SiC chip and the launch SMF point is small, forming an all-in-one compact fiber remoted sensing head, much like traditional SMF sensors. FIG. 11(a) shows a temperature sensor embodiment 138 that is based on localized or point targeting of the SiC chip 68 to measure temperature dependent optical path length change (OPL). By making the light read zone 140 on the chip 68 small compared to the chip size 142, one can essentially remove the effects of pressure on the chip localized OPL. Such targeting is achieved using a point-to-point imaging lens 144 formation between the SMF-free-space interface 148 and the SiC chip C 68. Because the described chip thickness is small (e.g., 300 μm) versus the imaging lens focal length (e.g., 3 cm) deployed, the chip front 71 and back 69 faces retro-reflect the sensing light back to the SMF 74 for sensor signal processing. Each SMF 74 can have an optional electronically controlled tilt control stage to keep the SMF 74 aligned with the SiC chip 68. The entire assembly can be mounted in an appropriate ceramic package. To enable a pressure sensor 150, a collimating optical beam architecture shown in FIG. 11(b) is used where a majority of chip C 68 is illuminated. The distance between the collimating lens and the SiC chip 68 can be designed to be as large or small as needed for the remoting application. As relative pressure between the chip sides builds, the chip 68 deforms and acts like a convex mirror, reducing the optical coupling between the SMF 74 and the chip 68. Hence, a pressure change causes wavefront optical beam spoiling. As SMFs are very sensitive to wavefront quality, one sees a different coupling efficiency. Thus by monitoring the SMF coupling efficiency, pressure can be estimated assuming the chip packaging is designed such that temperature variations cause minimal chip deformation effects. In case temperature effects should not be ignored, both temperature plus pressure may need to be measured to generate a calibration table for optical coupling efficiency.

Figure 12:
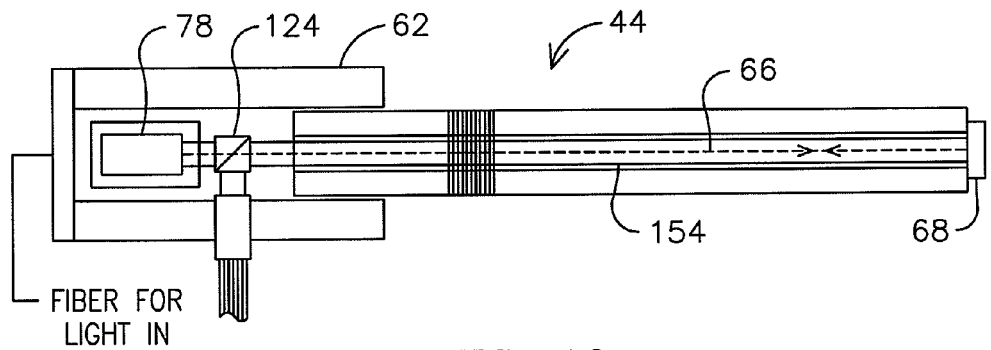
FIG. 12 shows an example embodiment of a packaged pressure-only sensor design for long range access of hot zone.

The key to pressure sensing using SiC involves global targeting of the SiC chip with received light pattern undergoing image (versus point zone) processing. FIG. 12 shows such a design using a long remoting probe 44. Here, note the large beam cross-section of the targeting beam that strikes the SiC acting as a weak convex mirror under applied pressure. This weak lensing changes the detected size of the optical beam image at the receiver optics that can be an optical multi-fiber bundle 154 or a miniature camera 122 as in FIG. 8. Using image processing, a pressure versus image size chart can be generated for sensor calibration and pressure measurement.

Figure 13:
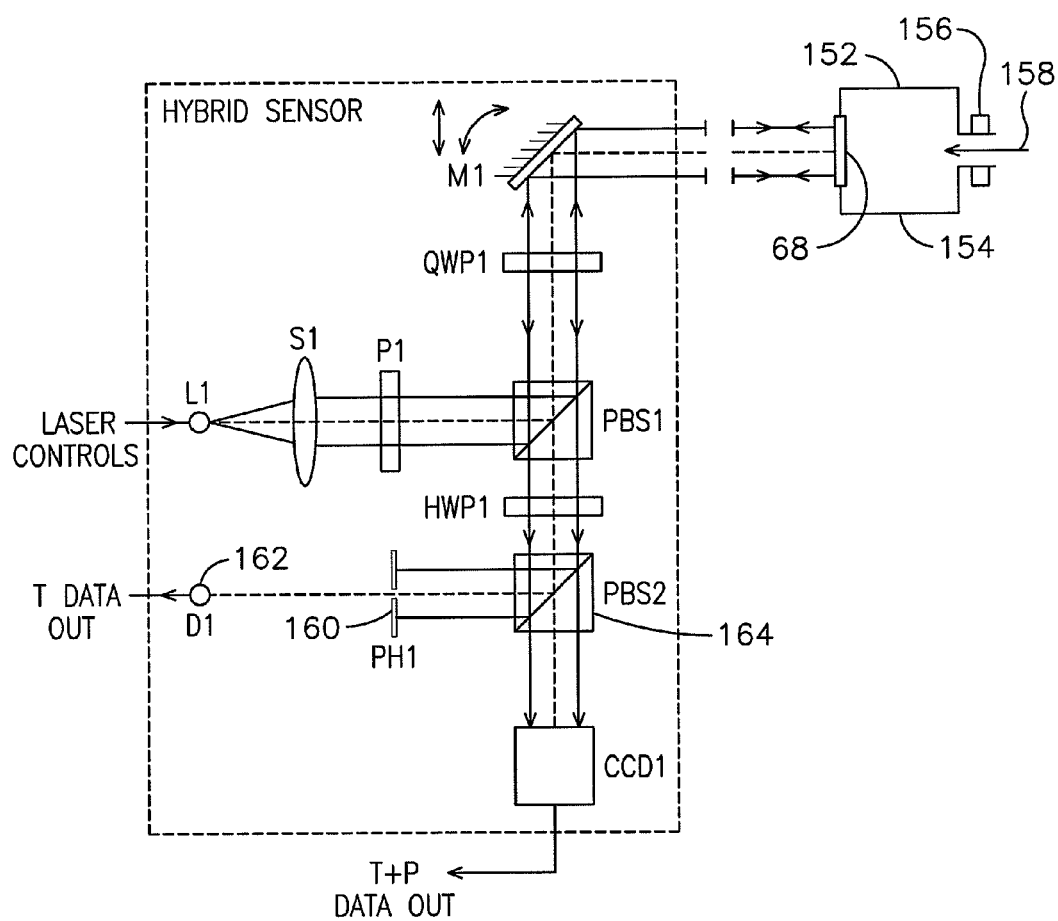
FIG. 13 shows an example embodiment of a Wireless Hybrid Optical Sensor for Simultaneous Temperature and Pressure Measurements for short access points.

The more powerful sensor is one that can simultaneously provide both temperature and pressure data as in FIG. 8. FIG. 13 shows an alternate implementation of the described hybrid sensor concept that uses a remotely placed all-passive optical sensor capsule 152 made of single crystal SiC chip 68 acting as the capsule window and a pressure sealed capsule assembly 154 made of a suitable high pressure high temperature material such as the previously mentioned sintered SiC tube. The FIG. 13 design is suited for near access sensing within the hot gas environment of a power plant. The capsule 152 has a high pressure connector 156 that interfaces to the high pressure hot gas flow system that is linked to the high temperature high pressure hot gas flow 158 such as a fossil fuel plant under test. The SiC optical window sits in a specially designed sealed pressure seat that creates the desired high pressure boundary conditions for the deployed SiC chip 68 within the capsule 152. One can also envision the FIG. 13 pressure sensor module used as a pressure stick inserted into a pressure sealed cavity to allow deep access pressure readings such as well within a combustion chamber. Hence, depending on the application, appropriate packaging must be deployed.

In FIG. 13, the reflected beam enters a light path containing a pin-hole (PH1) 160 that accepts only the on-axis rays from the SiC chip 68. After the pin-hole 160, a point detector D1 162 picks up the optical power from the selected on-axis rays. Thus, the localized effect is captured by monitoring the on-axis central rays from the SiC chip 68. As the temperature changes, the SiC chip optical path length (OPL) changes dominated by the material refractive index change. By measuring this OPL change, the temperature of the chip 68 can be measured. On the other-hand, the sensing straight beam passes through PBS2 164 to impinge on a two dimensional (2-D) optical detector D2 122 such as a CCD chip. As pressure changes inside the capsule (outside the capsule is 1 atm), the SiC chip 68 deforms to produce a convex mirror effect. Note that only near the on-axis condition are the faces of the chip normal to the incident beam, hence producing true retro-reflection to create beams that pass via the pinhole 160 to D1 162 to make the temperature-only measurement. In effect, as pressure (P) changes, the on-axis ray bundle remains essentially the same allowing a pressure independent temperature measurement. It is important to note that the SiC chip 68 and chip seating in the capsule 152 can be designed such that the out-of-plane deflection is mainly caused by internal pressure change with minimal contribution from temperature (T) effects. Such a design is possible by essentially using a chip packaging/boundary material with a similar CTE to single crystal SiC 68 like the sintered SiC tube material where CTE's match. Pressure (P) plus temperature data is picked up by the optical detector 122 and then processed to determine true pressure readings.

Ideally, one would like a robust optical sensor that can be remoted, is minimally invasive, works at high temperatures (e.g., 2000° C.) and pressures including chemically corrosive environments, requires low cost low loss optics, has high sensing resolution over any extended wide unambiguous range, and provides easy access to many sensing points. In the non-provisional application: N. A. Riza and F. Perez, "High Temperature Minimally Invasive Optical Sensing Modules," described were module designs for the needed extreme environment minimally invasive optical free-space laser beam targeted optical sensor using preferably single crystal Silicon Carbide (SiC) optical sensor chip (s) acting as a natural Fabry-Perot Etalon (s). A key point in these designs is that laser light is launched into freespace using a Single-Mode Fiber (SMF); hence the light beam striking the temperature sensing SiC crystal has excellent spatial coherence (or collimation properties), making the optically sensed reading highly accurate and sensitive. The present application describes robust optical probe designs for these earlier described SiC single crystal optical sensors, including techniques for measurement of temperature and pressure.

In this application we propose the self-calibrating and aligning aspect of the probe design via the use of SMF optics. Specifically, the SMF acts as a confocal optical system that insures that the sensor is properly aligned and hence providing the correct sensing data. Earlier in the non-provisional application: N. A. Riza and F. Perez, "High Temperature Minimally Invasive Optical Sensing Modules," mechanical motion of alignment mirrors were proposed to keep the freespace laser beam targeting on the SiC chip and receive optical detector. Here, proposed is a simpler non-mirror electronically actuated mechanical alignment assembly technique for the SMF-Lens combination so the sensor probe can implement fast real-time alignment operations for the freespace beam striking the sensing SiC single crystal that is acting as a temperature sensor. In other words, using for example fine tilt control piezo-electric motion control mechanics on the entire SMF-Fiber lens (FL) assembly, one can accurate point the laser beam (LB) to the correct retroreflective position on the SiC chip, thus enabling robust temperature probe design in harsh environments.

Proposed are packaged probe designs using laser-bonded single crystal SiC chip on-to a SiC (e.g., re-crystallized SiC) tube assembly that provides an excellent match of the SiC tube and SiC single crystal material Coefficients of Thermal Expansions (CTEs), hence preventing breaking of the SiC chip due to extreme temperature swings. Also provided is a vacuum sealed tube design using a glass window made for example from low CTE Borosilicate Glass (called Pyrex by Corning) or low CTE (0.55 microns/meter-deg. C.) synthetic fused silica or BK7 Glass (Schott Glass). Key points to note is that the SiC tube materials (e.g., polycrystalline SiC) has a lower Coefficient of Thermal Conductivity (CTC: units W/m-K of 33 to 270 W/K-m)) than high optical quality single crystal SiC (CTE: 330 W/K-m), yet both have similar CTEs around 4.2 to 4.68 ppm/K. This helps in preventing heat transfer from the hot chip end of the tube to the glass window end of the tube. Further low CTC tubing such as made from ceramics such as Alumina $Al_2O_3$ or Silicon (CTC: 150 W/K-m) is also used from the glass window edge to the cooler insertion point zone of the probe where the alignment and launch-receive optics sits in an ambient (<65° C.) temperature chamber. The proposed probe can also use convention cooling on the tubing near the transmit/receive fiber and bulk optics assembly to keep temperatures down to <65° C. in the optical enclosure, as typically needed for SMF optics. Such a probe is ideal for power plant systems where extreme temperatures range from 1400° C. to 1600° C. in the hot zones of the chambers that are near a meter inside the chamber with chamber wall temperatures around 300° C. to 500° C. Using a variety of SiC tubes and other low CTC ceramic tubes, various probe designs (see FIG. 3-4) are proposed for extreme temperature, pressure, and corrosion conditions.

General applications for the proposed sensor include use in fossil fuel-based power systems, aerospace/aircraft systems, satellite systems, deep space exploration systems, and drilling and oil mining industries. In other words, both extremely hot or extremely cold conditions can use the proposed temperature probes. In fact, cold conditions tend to be more inert and stable and hence one can expect exceptional performance from the proposed SiC chip and tube-based probes.

While the preferred embodiments of the present invention have been shown and described herein, it will be obvious that such embodiments are provided by way of example only. Numerous variations, changes and substitutions will occur to those of skill in the art without departing from the invention herein. Therefore, it is intended that the invention not be limited to the particular disclosed as the best mode contemplated for carrying out this invention, but that the invention will include all embodiments falling within the scope of the appended claims.

What is claimed is:

1. An optical sensor comprising:
   a chamber;
   a tube assembly having an aperture formed in a wall of the chamber;
   an optical etalon chip having a known characteristic that changes responsive to an environmental condition being experienced by the tube assembly; and
   a light directing element for directing light beams through the aperture at the optical etalon chip and receiving reflected light beams from the optical etalon chip;
   wherein the light directing element comprises a single mode fiber for emitting the light beams along a free space path to the optical etalon chip and receiving the reflected light beams from the free space path and a lens for focusing the emitted light beams and received light beams on a focused spot of the optical etalon chip; and
   wherein the reflected light beams are used for determining an environmental condition in the tube assembly.

2. The sensor of claim 1, further comprising a light source for providing a first light beam at a first frequency and a second light beam at a second frequency to the light directing element.

3. The sensor of claim 1, further comprising a processor for identifying a first condition of the first light beam reflected from the optical etalon chip and a second condition of the first light beam reflected from the optical etalon chip and calculating a thickness of the optical etalon chip responsive to the first condition, the second condition, and the known characteristic.

4. The sensor of claim 1, further comprising a two dimensional optical detector for generating an image responsive to the received light beams.

5. The sensor of claim 4, further comprising an image processor in communication with the two dimensional optical detector for analyzing the image to determine a pressure on the optical etalon chip.

6. The sensor of claim 1, wherein the light directing element further comprises a mechanism for aiming the light beams at the optical etalon chip to achieve a desired light incidence angle with respect to a surface of the optical etalon chip.

7. The sensor of claim 6, wherein the mechanism comprises a tilt element.

8. The sensor of claim 6, wherein the mechanism comprises a translation element.

9. The optical sensor of claim 1 further comprising a plurality of small chambers encased within a single large chamber, each having an inlet for receiving a fluid and/or gas into the chamber, an aperture formed in a wall of the chamber, and the optical etalon chip having a known characteristic that changes responsive to an environmental condition sealing the aperture, all collectively configured to provide for fault-tolerant and/or self-calibrating sensing.

10. The optical sensor of claim 2 wherein the light source is configured to provide a light beam capable to burn-off debris encountered by the light beam.

11. The optical sensor of claim 2 wherein the light source is configured to provide a light beam capable to used to determine temperature of a moving part when the optical etalon chip is applied to an apparatus having a moving part.

12. The optical sensor of claim 1, wherein the optical sensor is configured to simultaneously measure temperature and pressure by using localized optical beam targeting for temperature sensing and spatial and/or global optical targeting of the etalon for pressure sensing via optical interference pattern detection and processing.

13. The optical sensor of claim 1, wherein the optical etalon chip comprises a SiC crystal chip.

14. The optical sensor of claim 13, wherein an outer diameter of the tube is smaller than a diameter of the SiC crystal chip.

15. The optical sensor of claim 1, further comprises an optical detector to measure optical power.

16. The optical sensor of claim 1, further comprises a pressure sensor.

17. The optical sensor of claim 16, wherein the pressure sensor is remote from the optical sensor and wherein the optical etalon chip is configured as a pressure dependant concave lens to diverge an input laser beam.

18. The optical sensor of claim 1, wherein the optical etalon chip is point targeted to measure temperature dependent optical path length change.

19. An optical sensor comprising:
   a chamber having an inlet for receiving a fluid and/or gas into the chamber;
   an aperture formed in a wall of the chamber;
   an etalon having a known characteristic that changes responsive to an environmental condition sealing the aperture; and
   a light directing element for directing light beams at the optical etalon chip and receiving reflected light beams from the optical etalon chip;
   wherein the light directing element comprises a tilt element mechanism for aiming the light beams at the optical etalon chip to achieve a desired light incidence angle with respect to a surface of the optical etalon chip; and
   wherein the reflected light beams are used for determining an environmental condition in the chamber.

20. The sensor of claim 19, further comprising a light source for providing a first light beam at a first frequency and a second light beam at a second frequency to the light directing element.

21. The optical sensor of claim 19, wherein the optical sensor is configured to simultaneously measure temperature and pressure by using localized optical beam targeting for temperature sensing and spatial and/or global optical targeting of the etalon for pressure sensing via optical interference pattern detection and processing.

22. The optical sensor of claim 19, wherein the optical sensor is configured to measure a temperature of a moving wheel.

23. The optical sensor of claim 22, wherein a laser bonding zone is formed at an outer perimeter of the light directing element.

24. The optical sensor of claim 20, wherein the light directing element comprises an inner localized and flat region which is targeted by the laser beams for temperature readings.

25. The optical sensor of claim 19 wherein the optical sensor is configured for insertion into a pressure zone.

26. The optical sensor of claim 19 wherein the light directing element is located on a window inside of a pressure vessel.

* * * * *